(12) United States Patent
Umezawa-Vizzini et al.

(10) Patent No.: US 9,714,302 B2
(45) Date of Patent: Jul. 25, 2017

(54) PROCESS FOR PREPARING SPHERICAL POLYMERIZATION CATALYST COMPONENTS FOR USE IN OLEFIN POLYMERIZATIONS

(71) Applicant: W. R. GRACE & CO.—CONN., Columbia, MD (US)

(72) Inventors: Kayo Umezawa-Vizzini, Pasadena, TX (US); Vladimir P. Marin, Houston, TX (US); Michael Spencer, Houston, TX (US); Neil J. O'Reilly, Seabrook, TX (US); Ahmed Hintolay, Sugarland, TX (US)

(73) Assignee: W. R. GRACE & CO.—CONN., Columbia, MD (US)

( * ) Notice: Subject to any disclaimer, the term of this patent is extended or adjusted under 35 U.S.C. 154(b) by 301 days.

(21) Appl. No.: 14/512,130

(22) Filed: Oct. 10, 2014

(65) Prior Publication Data

US 2016/0102156 A1    Apr. 14, 2016

(51) Int. Cl.
*C08F 10/06* (2006.01)
*C08F 110/06* (2006.01)

(52) U.S. Cl.
CPC ............ *C08F 10/06* (2013.01); *C08F 110/06* (2013.01)

(58) Field of Classification Search
None
See application file for complete search history.

(56) References Cited

U.S. PATENT DOCUMENTS

| | | | |
|---|---|---|---|
| 4,311,817 | A | 1/1982 | Morita et al. |
| 4,393,182 | A | 7/1983 | Goodall et al. |
| 4,414,132 | A | 11/1983 | Goodall et al. |
| 4,487,846 | A | 12/1984 | Bailly et al. |
| 4,663,299 | A | 5/1987 | Chadwick et al. |
| 4,728,704 | A | 3/1988 | Chadwick et al. |

(Continued)

FOREIGN PATENT DOCUMENTS

| | | |
|---|---|---|
| CN | 1086394 A | 5/1994 |
| CN | 1180712 A | 5/1998 |

(Continued)

OTHER PUBLICATIONS

Evonik Industries Viscoplex 1-254 Safety Data Sheet (2015).*
(Continued)

*Primary Examiner* — Catherine S Branch
(74) *Attorney, Agent, or Firm* — Foley & Lardner LLP

(57) ABSTRACT

A method of making a solid catalyst component for production of a polyolefin, including the steps of: a) dissolving a halide-containing magnesium compound in a mixture including alkylepoxide, an organic phosphorous compound, a carboxylic acid or anhydride, and a hydrocarbon solvent to form a homogenous solution; b) optionally treating the homogeneous solution with a halogenating agent; c) treating the homogenous solution with a first titanium halide compound in the presence of a surface modifier and optionally a first electron donor to form a solid precipitate, wherein, if present, the first electron donor is an ether; d) optionally treating the solid precipitate with a second electron donor; and e) treating the solid precipitate with a second titanium halide compound and optionally with a second electron donor to form the solid catalyst component.

16 Claims, 8 Drawing Sheets

(56) References Cited

U.S. PATENT DOCUMENTS

| | | | |
|---|---|---|---|
| 4,784,983 A | 11/1988 | Mao et al. | |
| 4,861,847 A | 8/1989 | Mao et al. | |
| 5,192,729 A | 3/1993 | Woo et al. | |
| 5,773,537 A | 6/1998 | Mueller et al. | |
| 5,885,920 A | 3/1999 | Takahashi et al. | |
| 5,955,396 A | 9/1999 | Lee et al. | |
| 6,034,189 A | 3/2000 | Shinozaki et al. | |
| 6,218,331 B1 | 4/2001 | DiMaio et al. | |
| 6,376,417 B1 | 4/2002 | Yang et al. | |
| 6,861,385 B2 | 3/2005 | Arletti et al. | |
| 6,903,069 B2 | 6/2005 | Pingel et al. | |
| 6,962,889 B2 | 11/2005 | Zhu et al. | |
| 7,135,531 B2 | 11/2006 | Zhu et al. | |
| 7,238,637 B2 | 7/2007 | Garoff et al. | |
| 7,256,150 B2 | 8/2007 | Denifl et al. | |
| 7,271,119 B2 | 9/2007 | Denifl et al. | |
| 7,341,971 B2 | 3/2008 | Denifl et al. | |
| 7,465,775 B2 | 12/2008 | Vestberg et al. | |
| 7,902,108 B2 | 3/2011 | Denifl et al. | |
| 8,344,079 B2 | 1/2013 | Spencer | |
| 2005/0054773 A1 | 3/2005 | Hosaka et al. | |
| 2005/0054792 A1 | 3/2005 | Kilty et al. | |
| 2005/0176900 A1 | 8/2005 | Zhu et al. | |
| 2005/0209094 A1 | 9/2005 | Knoeppel et al. | |
| 2006/0166814 A1 | 7/2006 | Leinonen et al. | |
| 2008/0132660 A1 | 6/2008 | Wolfschwenger et al. | |
| 2009/0012247 A1 | 1/2009 | Bartke et al. | |
| 2009/0171042 A1 | 7/2009 | Denifl et al. | |
| 2010/0168349 A1* | 7/2010 | Fujiwara | C08F 10/06 526/116 |
| 2010/0222530 A1* | 9/2010 | Chen | C08F 110/06 526/135 |
| 2010/0273641 A1* | 10/2010 | Chen | C08F 110/06 502/126 |
| 2011/0009257 A1 | 1/2011 | Rekonen et al. | |
| 2012/0277090 A1 | 11/2012 | Spencer et al. | |

FOREIGN PATENT DOCUMENTS

| | | |
|---|---|---|
| CN | 1463990 A | 12/2003 |
| EP | 255790 A1 | 2/1988 |
| EP | 258089 A1 | 3/1988 |
| EP | 426139 A2 | 5/1991 |
| EP | 459009 A2 | 12/1991 |
| EP | 536840 A1 | 4/1993 |
| EP | 1270610 A1 | 1/2003 |
| EP | 1484345 A1 | 12/2004 |
| EP | 1489110 A1 | 12/2004 |
| EP | 1598379 A1 | 11/2005 |
| EP | 1803743 A1 | 7/2007 |
| IE | 912163 A1 | 1/1992 |
| JP | S56-67311 A | 6/1981 |
| JP | S59133209 A | 7/1984 |
| JP | S62-252404 A | 11/1987 |
| JP | S62-267304 A | 11/1987 |
| JP | S63-56506 A | 3/1988 |
| JP | S63-57610 A | 3/1988 |
| JP | S-64-105 A | 1/1989 |
| JP | H07-9309 A | 1/1995 |
| JP | 2004-269467 A | 9/2004 |
| JP | 2006-274103 A | 10/2006 |
| JP | 2007-146065 A | 6/2007 |
| KR | 0121546 B1 | 11/1997 |
| WO | WO-92/00332 A1 | 1/1992 |
| WO | WO-03/000754 A1 | 1/2003 |
| WO | WO-03/000755 A1 | 1/2003 |
| WO | WO-03/000757 A1 | 1/2003 |
| WO | WO-03/106508 A1 | 12/2003 |
| WO | WO-03/106510 A1 | 12/2003 |
| WO | WO-2006/063973 A1 | 6/2006 |
| WO | WO-2006/069733 A1 | 7/2006 |
| WO | WO-2007/004839 A1 | 1/2007 |
| WO | WO-2007/137852 A1 | 12/2007 |
| WO | WO-2008/080621 A1 | 7/2008 |
| WO | WO-2009/040201 A1 | 4/2009 |

OTHER PUBLICATIONS

Jin Suk Chung et al. "Morphology control of a $MgCl_2$-supported Ziegler-Natta catalyst by the recrystallization method", Macrommol. Chem. Phys. vol. 196, pp. 1205-1210, 1995.

R. Jamjah et al., Morphological Study of Spherical $MgCl_2.nEtOH$ Supported $TiCl_4$ Ziegler-Natta Catalyst for Polymerization of Ethylene, Journal of Applied Polymer Science, vol. 101, pp. 3829-3834, 2006.

Rikuo Ohnishi et at "A New Method for Producing High Melt Strength Poly(propylene) with Reactive Extrusion", Macromolecular Materials and Engineering, vol. 290, pp. 1227-1234, 2005.

Ma Zhenli et al. "Progress in Spherical $MgCl_2$-Supported Ziegler-Natta Catalysts for i-polypropylene Preparation", Department of Polymer Science and Engineering, Zhejiang University, Hangzhou, 310027, China, Jingxi Shiyou Huagong (2004), (1) pp. 62-66.

M. Bartke et al. "Reaction Engineering Aspects of Single-Site Catalyst Heterogenation Techniques", DECHEMA Monographs, 2004, 138, 8th International Workshop on Polymer Reaction Engineering, Hamburg, 2004, pp. 181-187.

F. Jianqi et al. "Polymerization of Propylene on $TiCl_4/MgCl_2$ Sperical Catalyst", Research Institute of Petroleum Processing, SINOPEC, Beijing 100083, China, Shiyou Huagong (2006), 35(3), pp. 231-235.

International Search Report and Written Opinion of the International Searching Authority for Application No. PCT/US2015/054432 issued Jan. 25, 2016, 10 pages.

* cited by examiner

PROCESS FOR PREPARING SPHERICAL POLYMERIZATION CATALYST COMPONENTS FOR USE IN OLEFIN POLYMERIZATIONS

TECHNICAL FIELD

The present disclosure relates to a process for the production of spherical polymerization catalyst components, catalyst systems formed from the catalyst components, and methods of making the catalyst systems and olefin polymers and copolymers using the catalyst systems as described.

BACKGROUND

Polyolefins are a class of polymers derived from simple olefins. Known methods of making polyolefins involve the use of Ziegler-Natta polymerization catalysts. These catalysts polymerize olefin monomers using a transition metal halide to provide a polymer with various type of stereochemical configuration.

One type of Ziegler-Natta catalyst system comprises a solid catalyst component, constituted by a magnesium halide on which are supported a titanium compound and an internal electron donor compound. In order to maintain high selectivity for an isotactic polymer product, internal electron donor compounds must be added during catalyst synthesis. The internal donor can be various types. Conventionally, when a higher crystallinity of the polymer is required, an external donor compound is also added during the polymerization reaction.

During the past 30 years, numerous supported Ziegler-Natta catalysts have been developed which afford a much higher activity in olefin polymerization reactions and much higher content of crystalline isotactic fractions in the polymers they produce. With the development of internal and external electron donor compounds, polyolefin catalyst systems are continuously renovated.

The general production scheme for $MgCl_2$ supported catalysts includes a process to make $MgCl_2$ support, impregnation of $TiCl_4$ and Lewis base, and internal donor to the $MgCl_2$ surface. One of the methods of $MgCl_2$ supported catalyst preparation is the reaction of $Mg(OR)Cl$ or $Mg(OR)_2$ with excess $TiCl_4$ diluted in aromatic or halogenated solvents. In such a case, $MgCl_2$ support is formed from the reaction between the magnesium compound and $TiCl_4$ and the internal donor is added to the process during or after the precipitation of the solid support.

In another method, the alkoxy magnesium complex reacts first with electron donor precursor and then with $TiCl_4$. In this process, the electron donor precursor is converted to the desired internal donor during the formation of $MgCl_2$.

In another method, the solid $MgCl_2$ is used to prepare the $MgCl_2$ catalyst. The solid $MgCl_2$ is dissolved in suitable solvents such as alcohol. The solution is then treated with $TiCl_4$ to precipitate the supported $MgCl_2$ catalyst. For example, $MgCl_2$ can be dissolved in hot ethanol and precipitated in cooled hexane in presence of tetraethylorthosilicate (TEOS).

U.S. Pat. Nos. 6,376,417, 4,784,983 and 4,861,847 describe a catalyst system for use in olefinic polymerization prepared by dissolving a halide of magnesium in a solvent system consisting of an organic compound, an organic phosphorous compound and an inert diluent to form a homogenous solution; mixing the homogenous solution with a halide of titanium to form a mixture; precipitating a solid from the mixture in the presence of an auxiliary precipitant; treating the solid with a polycarboxylic ester to load the ester on the solid; and treating the ester loaded with the halide of titanium and the inert diluent.

SUMMARY

The following presents a simplified summary of the invention in order to provide a basic understanding of some aspects of the invention. This summary is not an extensive overview of the invention. It is intended to neither identify key nor critical elements of the invention nor delineate the scope of the invention. Rather, the sole purpose of this summary is to present some concepts of the invention in a simplified form as a prelude to the more detailed description that is presented hereafter.

Catalyst morphology control is an important aspect of industrial polyolefin plant operation. Catalyst morphology characteristics include particle size and particle size distribution, particle shape, and surface texture.

Catalyst morphology characteristics influence polymer powder properties such as the bulk density, flowability, degassing and particle adhesion. Such properties greatly influence plant operation efficiency. For example, unsuitable catalyst morphology may cause failure in polymer morphology control, which can lead to serious trouble in plant operation, such as fouling or sheeting.

Because of these reasons, $MgCl_2$ supported catalysts with good morphology control (required particle size and shape, narrow particle size distribution, high bulk density and low adhesion) are desired.

A first aspect includes a method of making a solid catalyst component for production of a polyolefin, comprising a) dissolving a halide-containing magnesium compound in a mixture comprising alkylepoxide, an organic phosphorous compound, a carboxylic acid or anhydride, and a hydrocarbon solvent to form a homogenous solution;

b) optionally treating the homogeneous solution with a halogenating agent;

c) treating the homogenous solution with a first titanium halide compound in the presence of a surface modifier and optionally a first electron donor to form a solid precipitate, wherein, if present, the first electron donor is an ether;

d) optionally treating the solid precipitate with a second electron donor; and e) treating the solid precipitate with a second titanium halide compound and optionally with a second electron donor to form the solid catalyst component, wherein step b) is performed and/or the first electron donor is present in step c).

In certain embodiments, the first electron donor is present in step c).

In certain embodiments, step b) is performed.

In certain embodiments, step b) is performed and the first electron donor is present in step c).

In certain embodiments of methods in which step b) is performed, the halogenating agent is an organic or inorganic compound containing at least one halogen atom that can be transferrable to a magnesium atom. In particular embodiments, the halogenating agent contains chlorine. In more particular embodiments, the halogenating agent is selected from the group consisting of arynoyl chlorides, alkanoyl chlorides, and alkyl chlorides. In yet more particular embodiments, the halogenating agent is selected from the group consisting of phthaloyl chloride, benzoyl chloride, furoyl chloride, acetyl chloride, and linear or branched $(C_1-C_6)$alkyl chloride, and $(C_1-C_6)$alkanoyl chloride. In other embodiments, the halogenating agent is selected from the group consisting of HCl, $TiCl_4$, $R_nTiCl_{4-n}$, $SiCl_4$, $R_nSiCl_{4-n}$, and $R_nAlCl_{4-n}$, wherein R represents an alkyl, cycloalkyl, aromatic, or alkoxy, and n is a whole number satisfying the formula $0<n<4$.

In certain embodiments, the hydrocarbon solvent is an aromatic solvent, non-aromatic solvent, or a mixture comprising an aromatic solvent and a non-aromatic solvent. In particular embodiments, the aromatic solvent comprises toluene or $C_2$-$C_{20}$ alkylbenzene and the non-aromatic solvent comprises hexane or heptane. In more particular embodiments, a ratio of the non-aromatic solvent to the aromatic solvent is from 10:90 to 90:10 wt %, or from 20:80 to 80:20 wt %, or from 40:60 to 70:30 wt %.

In certain embodiments of methods in which the first electron donor is present in step c), the first electron donor is a di-($C_1$-$C_{12}$)alkyl ether. In particular embodiments, the first electron donor is a di-($C_1$-$C_6$)alkyl ether. In more particular embodiments, the di-($C_1$-$C_6$)alkyl ether is selected from the group consisting of dimethyl ether, diethyl ether, dipropyl ether, di-n-butyl ether, butyl propyl ether, diamyl ether, diisoamyl ether, and dihexyl ether.

In certain embodiments of methods in which the first electron donor is present in step c), a ratio of the first electron donor to the halide-containing magnesium compound is from 5:95 to 95:5 mol % or 10:90 to 50:50 mol %.

In certain embodiments, step a) is performed at a temperature of from 50° C. to 90° C.

In certain embodiments, step c) comprises: c1) mixing the homogenous solution with the first titanium halide compound in the presence of the surface modifier and the first electron donor; and c2) heating the mixture from step c1) to a temperature from 80° C. to 150° C. to obtain the precipitate.

In certain embodiments, step d) comprises: d1) adding the second electron donor to a solution containing the precipitate; and d2) bringing a temperature of the solid catalyst composition to from 80° C. to 150° C. and further treating with the second titanium halide compound and optionally the second electron donor to form the solid catalyst component. In particular embodiments, step d2) includes further treating with the second titanium halide compound and the second electron donor to form the solid catalyst component.

In certain embodiments, step d) comprises: d1) filtering out the precipitate; d2) optionally adding the second electron donor in a solvent to the precipitate; and d3) bringing a temperature of the solid catalyst composition to from 80° C. to 150° C. and further treating with the second titanium halide compound and optionally with the second electron donor to form the solid catalyst component. In particular embodiments, step d2) is performed. In other particular embodiments, step d3) includes further treating with the second titanium halide compound and the second electron donor to form the solid catalyst component. In more particular embodiments, step d2) is performed and step d3) includes further treating with the second titanium halide compound and the second electron donor to form the solid catalyst component.

In certain embodiments, the surface modifier is an acrylate-based additive. In particular embodiments, the surface modifier is at least one selected from the group consisting of a poly(($C_1$-$C_6$)alkyl)acrylate, a poly(($C_1$-$C_6$)alkyl)methacrylate, and a copolymer of poly(($C_1$-$C_6$)alkyl)acrylate and poly(($C_1$-$C_6$)alkyl)methacrylate. In particular embodiments, an amount of the surface modifier is 0.2-1.0 g per gram of the halide-containing magnesium compound.

In certain embodiments, the halide-containing magnesium compound is selected from the group consisting of magnesium chloride, magnesium bromide, magnesium iodide, and magnesium fluoride.

In certain embodiments, the first titanium halide compound and the second titanium halide compound are each independently represented by:

$$Ti(OR)_gX_{4-g}$$

wherein each R group independently represents an alkyl group having 1 to 4 carbon atoms, X represents Br, Cl, or I, and g is a whole number satisfying the formula $0 \leq g \leq 4$.

In certain embodiments, a ratio of the first titanium halide compound to the halide-containing magnesium compound in said step c) is from 1:1 to 15:1 or from 3:1 to 15:1 or from 3:1 to 10:1.

In certain embodiments, the organic phosphorous compound is represented by a structure:

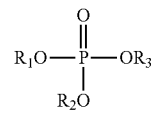

wherein $R_1$, $R_2$, and $R_3$ are each independently selected from the group consisting of methyl, ethyl, and linear or branched ($C_3$-$C_{10}$)alkyl groups.

In certain embodiments, the alkylepoxide is represented by

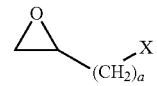

where "a" is from 1 to 5 and X is F, Cl, Br, I, or methyl.

In certain embodiments, the carboxylic acid or anhydride is at least one member selected from the group consisting of acetic anhydride, phthalic anhydride, succinic anhydride, maleic anhydride, pyromellitic dianhydride, acetic acid, propionic acid, butyric acid, acrylic acid, and methacrylic acid.

In certain embodiments, the second electron donor is at least one selected from the group consisting of carboxylic acid esters, ethers, and ketones. In particular embodiments, the carboxylic acid ester is a dicarboxylic acid ester. In more particular embodiments, the carboxylic acid ester is a long-chain dicarboxylic acid ester. In particular embodiments, the second electron donor includes at least one ether group and at least one ketone group.

In certain embodiments, the solid catalyst component has a spheroidal or spherical shape having an average largest dimension of from 5-200 μm.

A second aspect is a solid catalyst component produced by any of the methods described above.

A third aspect is a catalyst system for use in olefinic polymerization comprising (i) a solid catalyst component produced by any of the methods described above, (ii) an organoaluminum compound; and (iii) optionally an organosilicon compound. In certain embodiments, the organosilicon compound is present. In certain embodiments, the organoaluminum compound is an alkyl-aluminum compound. In particular embodiments, the alkyl-aluminum compound is a trialkyl aluminum compound. In more particular embodiments, the trialkyl aluminum compound is selected from the group consisting of triethylaluminum, triisobutylaluminum, and tri-n-octylaluminum.

A fourth aspect is a process for polymerizing or copolymerizing an olefin monomer, comprising the steps of: (i) providing a catalyst system of the third aspect; (ii) polymerizing or copolymerizing the olefin monomer in the presence of the catalyst system to form a polymer or a copolymer; and (iii) recovering the polymer or copolymer. In certain embodiments the olefin monomer being polymerized or copolymerized is selected from the group consisting of ethylene, propylene, 1-butylene, 1-methyl-1-pentene, 1-hexene, and 1-octene.

BRIEF DESCRIPTION OF THE FIGURES

The following detailed description can be read in connection with the accompanying drawings in which like numerals designate like elements and in which.

DETAILED DESCRIPTION

Figure 1:
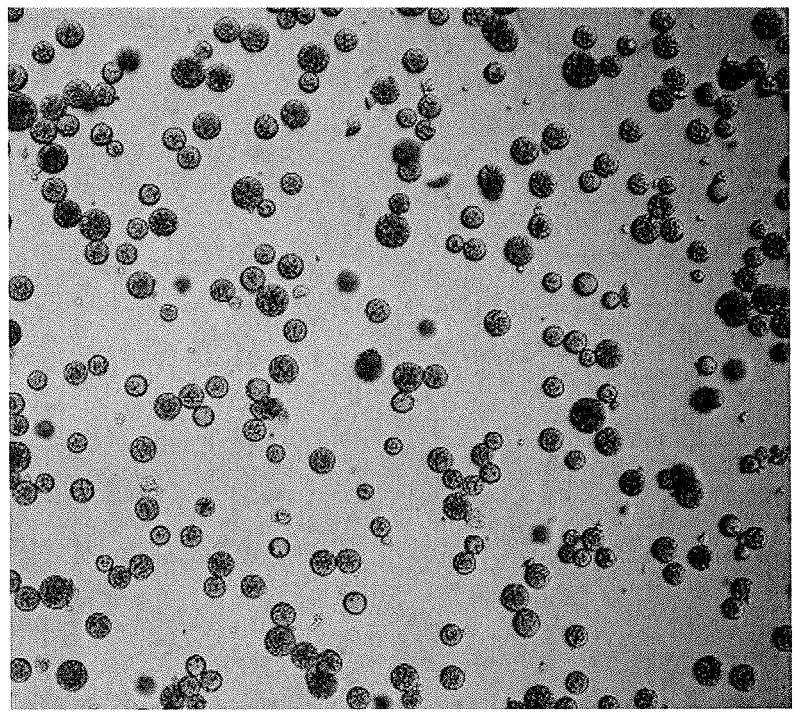
FIG. 1 shows a microscopic view of the catalyst component of Example 1.

Before describing several exemplary embodiments, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment. Thus, the appearances of the phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Although reference herein is to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Described herein are Ziegler-Natta catalyst systems and supports for Ziegler-Natta catalysts and methods of making the same. One aspect of the catalyst systems is a solid catalyst component containing a halide-containing magnesium compound and titanium compound for polymerizing an olefin, where the solid catalyst component has substantially spherical or spheroidal shape. The solid catalyst component can be used to form a competent Ziegler-Natta catalyst in combination with one or more external and/or internal electron donors and an organo-aluminum compound.

As used throughout this disclosure, the term "solid catalyst component" refers to a pre-catalyst containing a halide-containing magnesium compound and titanium compound, and optionally one or more internal electron donors that are useful for forming a competent Ziegler-Natta catalyst system upon combination with a main group metal alkyl.

In a typical manner of employing the Ziegler-Natta catalyst system, a solid catalyst component, an electron donor, and an organo-aluminum compound (a main group metal alkyl) form a slurry catalyst system, which can contain any suitable liquid such as an inert hydrocarbon medium. Examples of inert hydrocarbon media include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. The slurry medium can be hexane, heptane or mineral oil. The slurry medium can be different from the diluent used in forming the mixture from which the solid catalyst component is precipitated.

The herein described solid catalyst supports can be utilized in any suitable Ziegler-Natta polymerization catalyst system. Ziegler-Natta catalyst systems are comprised of a reagent or combination of reagents that are functional to catalyze the polymerization of 1-alkenes (α-olefins) to form polymers, typically with high isotacticity, when pro-chiral 1-alkenes are polymerized. The term "Ziegler-Natta catalyst" refers to any composition having a transition metal and a main group metal alkyl component capable of supporting catalysis of 1-alkene polymerization. The transition metal component is typically a Group IV metal such as titanium, or vanadium, the main group metal alkyl is typically an organoaluminum compound having a carbon-Al bond, and the electron donor can be any of numerous compounds including aromatic esters, alkoxysilanes, amines and ketones can be used as external donors added to the transition metal component and the main group metal alkyl component or an appropriate internal donor added to the transition metal component and the main group metal alkyl component during synthesis of those components. The details of the constituent, structure, and manufacture of the one or more electron donors and organoaluminum compound components are not critical to the practice of the described catalyst systems, provided that the Ziegler-Natta polymerization catalyst system has a solid catalyst component as described herein.

Described are methods of making a solid catalyst component for use in a Ziegler-Natta catalyst. A method according to a first aspect includes dissolving a halide-containing magnesium compound in a mixture comprising alkylepoxide, an organic phosphorous Lewis base, a carboxylic acid or anhydride, and a first hydrocarbon solvent to form a homogenous solution. Optionally treating the homogenous solution a halogenating agent. Further treating the homogenous solution with a first titanium halide compound in the presence of a surface modifier and a first electron donor to form a solid precipitate, wherein the first electron donor is an ether. Treating the solid precipitate with a second titanium halide compound and a second electron donor to form the solid catalyst component.

A method according to a second aspect includes dissolving a halide-containing magnesium compound in a mixture comprising alkylepoxide, an organic phosphorous Lewis base, a carboxylic acid or anhydride, and a first hydrocarbon solvent to form a homogenous solution. Treating the homogenous solution with a halogenating agent. Further treating the homogenous solution with a first titanium halide compound in the presence of a surface modifier and optionally a first electron donor to form a solid precipitate, wherein the first electron donor is an ether. Treating the solid precipitate with a second titanium halide compound and a second electron donor to form the solid catalyst component.

Combining the halide-containing magnesium compound, alkylepoxide, organic phosphorous Lewis base, carboxylic acid or anhydride, surface modifier, and hydrocarbon solvent creates an emulsion with two phases: the solvent phase and the magnesium phase. Phase separation is accomplished by proper solvent selection. Solvent selection involves considering one or more of physical properties differences in polarity, density, and surface tension among others causing the separation between the solvent and the magnesium phase. Toluene is an organic solvent diluent that has been used for the formation of solid titanium catalyst components; however, use of toluene does not always promote the formation of two phases. Also, it has been discovered that the use of other alkylbenzene compounds, hexane, and heptane as a solvent can in some instances result in the formation of a solvent phase and a magnesium phase. The two phases are maintained upon subsequent addition of the titanium compound.

The homogenous solution can then be treated with a halogenating agent. The morphology of the solid catalyst component is affected by how the halogenation and crystallization are conducted. If the chlorination conditions are too harsh, the morphology issues such as the catalyst being non spherical or having internal voids may result. For example, when $TiCl_4$ is used for halogenation, the mild reaction condition is required before precipitation to obtain the good solid catalyst component.

The fully halogenated magnesium compound in the homogenous solution can then be treated with a titanium halide compound to form a solid precipitate. The solution can be raised to a second temperature greater than the first temperature and a surface modifier can be added to control phase morphology. Also, when treating with a titanium halide compound. an electron donor can be added. The first electron donor is an ether The first electron donor changes the viscosity and polarity of the solution that effects on the morphology precipitated particles, in particular, particle size, particle shape and particle density.

The homogenous solution can be in the form of dispersions, colloids, emulsions, and other two-phase systems. The homogenous solution can be emulsified using conventional emulsion techniques including one or more of agitation, stirring, mixing, high and/or low shear mixing, mixing nozzles, atomizers, membrane emulsification techniques, milling sonication, vibration, microfluidization, and the like.

Examples of the halide-containing magnesium compound include magnesium chloride, magnesium bromide, magnesium iodide, and magnesium fluoride. In one embodiment, the halide-containing magnesium compound is magnesium chloride.

In certain embodiments, the alkylepoxide compound is a glycidyl-containing compound the structure of Formula I:

wherein "a" is from 1 to 5 and X is F, Cl, Br, I, or methyl. In one embodiment, the alkylepoxide is epichlorohydrin. The alkylepoxide can be a haloalkylepoxide or a nonhaloalkylepoxide.

A Lewis base is any species that donates lone pair electrons. Examples of Lewis bases include an organic phosphorous Lewis base such as phosphate acid esters such as trialkyl phosphate acid ester. A trialkyl phosphate acid ester can be a compound with the structure of Formula II:

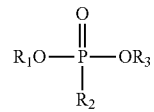

wherein $R_1$, $R_2$, and $R_3$ are each independently selected from the group consisting of methyl, ethyl, and linear or branched ($C_3$-$C_{10}$)alkyl groups. In one embodiment, the trialkyl phosphate acid ester is tributy phosphate acid ester.

In certain embodiments, the carboxylic acid or anhydride is at least one member selected from acetic anhydride, phthalic anhydride, succinic anhydride, maleic anhydride, pyromellitic dianhydride, acetic acid, propionic acid, butyric acid, acrylic acid, and methacrylic acid. In one embodiment, the carboxylic acid or anhydride is phthalic anhydride.

The halide-containing magnesium compound, alkylepoxide, Lewis base, and carboxylic acid or anhydride are contacted in the presence of a hydrocarbon solvent. The hydrocarbon solvent can include aromatic or non-aromatic solvents or combinations thereof. In certain embodiments, the aromatic hydrocarbon solvent is selected from toluene and $C_2$-$C_{20}$ alkylbenzene. In certain embodiments, the non-aromatic hydrocarbon solvent is selected from hexane and heptane. In an embodiment, the hydrocarbon solvent is a mixture of toluene and hexane. In another embodiment, the hydrocarbon solvent is a mixture of ethylbenzene and heptane. In certain embodiments, a ratio of the non-aromatic solvent to the aromatic solvent is from 10:90 to 90:10 wt % or 30:70 to 70:30 wt % or 40:60 to 65:35 wt % or 50:50 to 45:55 wt %.

In a particular embodiment, the halide-containing magnesium compound, alkylepoxide, organic phosphorous Lewis base, and carboxylic acid or anhydride are contacted in the presence of an organic solvent at a first temperature from about 25 to about 100° C. to form a homogenous solution. In another embodiment, the first temperature is from about 40 to about 90° C. or from about 50 to about 70° C. In a certain embodiment, the molar ratio of the magnesium compound to alkylepoxide is from about 0.1:2 to about 2:0.1 or about 1:0.25 to about 1:4 or about 1:0.9 to about 1:2.2. In a certain embodiment, the molar ratio of the magnesium compound to the Lewis base is from about 1:0.1 to about 1:4 or 0.5:1 to 2.0:1 or 1:0.7 to 1:1. Without wishing to be bound by any theory, it is believed that a halogen atom is transferred from the magnesium compound to the alkylepoxide to open the epoxide ring and form an alkoxide magnesium species having a bond between the magnesium atom and the oxygen atom of the newly formed alkoxide group. The Lewis base functions to increase solubility of the magnesium-containing species present.

In certain embodiments, the carboxylic acid or anhydride may be added after the initial halide-containing magnesium compound, alkylepoxide, and organic phosphorous Lewis base are contacted, while maintaining the temperature. In such embodiments, the halide-containing magnesium compound, alkylepoxide, and organic phosphorous Lewis base may be contacted in the presence of an aromatic hydrocarbon solvent, such as toluene, and the carboxylic acid or anhydride is added in a non-aromatic hydrocarbon solvent, such as hexane.

After formation, the homogenous solution can be optionally treated with a halogenating agent. The halogenating agent can be an organic or inorganic compound containing at least one halogen atom that can be transferrable to a magnesium atom. In particular embodiments, the halogenating agent contains chlorine. In particular embodiments, the halogenating agent is selected from arynoyl chlorides, alkanoyl chlorides, and alkyl chlorides. In certain embodiments, the halogenating agent is selected from phthaloyl chloride, benzoyl chloride, furoyl chloride, acetyl chloride, linear or branched $(C_1-C_6)$alkyl chloride, and $(C_1-C_6)$alkanoyl chloride. In other embodiments, the halogenating agent is selected from HCl, $TiCl_4$ $R_nTiCl_{4-n}$, $SiCl_4$, $R_nSiCl_{4-n}$, and $R_nAlCl_{4-n}$, wherein R represents an alkyl, cycloalkyl, aromatic or alkoxy, and n is a whole number satisfying the formula 0<n<4. In certain embodiments the ratio of halogenating agent to magnesium compound is at least 1:1 mol ratio.

After the optional halogenating agent treatment, a titanium halide compound is added in the presence of a surface modifier and an optional first electron donor, while maintaining the homogenous solution at a second temperature. In an embodiment, the molar ratio of the amount of titanium halide compound added to the halide-containing magnesium compound is from about 3:1 to about 15:1 or from about 5:1 to about 10:1. Upon addition of the titanium halide compound, the titanium compound enters the magnesium phase where the titanium compound reacts with the haloalkoxide magnesium compound.

The magnesium-containing species phase is dispersed within the solvent phase. The size and shape of droplets forming the magnesium phase can be controlled through a combination of adjusting the temperature, adjusting the agitation energy, and including/excluding various additives, including the surface modifier. After phase separation and/or titanium compound addition, the mixture is raised to a third temperature higher than the second temperature. In one embodiment, the third temperature is from about 15 to about 100° C. In another embodiment, the third temperature is from about 20 to about 90° C. or from about 50 to about 85° C. or from about 60 to 85° C. In an embodiment, while the mixture is between the first and second temperatures, a surface modifier is added to facilitate formation of spherical droplets of the magnesium phase surrounded by the solvent phase. That is, the addition of a surface modifier can assist in controlling the morphology of the droplets of the magnesium phase.

General examples of the surface modifier include polymer surfactants, such as polyacrylates, polymethacrylates, polyalkyl methacrylates, or any other surfactant that can stabilize and emulsify. Surfactants are known in the art, and many surfactants are described in McCutcheon's "Volume I: Emulsifiers and Detergents", 2001, North American Edition, published by Manufacturing Confectioner Publishing Co., Glen Rock, N.J., and in particular, pp. 1-233 which describes a number of surfactants and is hereby incorporated by reference for the disclosure in this regard. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of monomers that can be polymerized using known polymerization techniques into polymer surfactants include one or more of acrylate; tert-butyl acrylate; n-hexyl acrylate; methacrylate; methyl methacrylate; ethyl methacrylate; propyl methacrylate; isopropyl methacrylate; n-butyl methacrylate; t-butyl methacrylate; isobutyl methacrylate; pentyl methacrylate; isoamyl methacrylate; n-hexyl methacrylate; isodecyl methacrylate; lauryl methacrylate; stearyl methacrylate; isooctyl acrylate; lauryl acrylate; stearyl acrylate; cyclohexyl acrylate; cyclohexyl methacrylate; methoxyethyl acrylate; isobenzyl acrylate; isodecyl acrylate; n-dodecyl acrylate; benzyl acrylate; isobornyl acrylate; isobornyl acrylate; isobornyl methacrylate; 2-hydroxyethyl acrylate; 2-hydroxypropyl acrylate; 2-methoxyethyl acrylate; 2-methoxybutyl acrylate; 2-(2-ethoxyethoxy) ethyl acrylate; 2-phenoxyethyl acrylate; tetrahydrofurfuryl acrylate; 2-(2-phenoxyethoxy)ethyl acrylate; methoxylated tripropylene glycol monoacrylate; 1,6-hexanediol diacrylate; ethylene glycol dimethacrylate; diethylene glycol dimethacrylate; triethylene glycol dimethacrylate; polyethylene glycol dimethacrylate; butylene glycol dimethacrylate; trimethylolpropane-3-ethoxylate triacrylate; 1,4-butanediol diacrylate; 1,9-nonanediol diacryiate; neopentyl glycol diacrylate; tripropylene glycol diacrylate; tetraethylene glycol diacrylate; heptapropylene glycol diacrylate; trimethylol propane triacrylate; ethoxylated trimethylol propane triacrylate; pentaerythritol triacrylate; trimethylolpropane trimethacrylate; tripropylene glycol diacrylate; pentaerythritol tetraacrylate; glyceryl propoxy triacrylate; tris (acryloyloxyethyl)phosphate; 1-acryloxy-3-methacryloxy glycerol; 2-methacryloxy-N-ethyl morpholine; and allyl methacrylate, and the like.

In certain embodiments, the surface modifier is selected from poly($(C_1-C_6)$alkyl)acrylate, a poly($(C_1-C_6)$alkyl)methacrylate, and a copolymer of poly($(C_1-C_6)$alkyl)acrylate and poly($(C_1-C_6)$alkyl)methacrylate. In embodiments, a ratio of the surface modifier to halide-containing magnesium compound is from 1:10 to 2:1 wt % or from 1:5 to 1:1 wt %.

Examples of polymer surfactants that are commercially available include those under the trade designation VISCO-PLEX® available from RohMax Additives, GmbH, including those having product designations 1-254, 1-256 and those under the trade designations CARBOPOL® and PEMULEN® available from Noveon/Lubrizol.

The polymer surfactant is typically added in a mixture with an organic solvent. When added as a mixture with an organic solvent, the weight ratio of surfactant to organic solvent is from about 1:20 to about 2:1. In another embodiment, the weight ratio of surfactant to organic solvent is from about 1:10 to about 1:1. In yet another embodiment, the weight ratio of surfactant to organic solvent is from about 1:4 to about 1:2.

In certain embodiments, the titanium halide compound is added to the homogenous solution in the presence of the surface modifier and a first electron donor. In certain embodiments, the first electron donor is an ether. Examples of the first electron donor include di-($C_1$-$C_{12}$)alkyl ether. In certain embodiments, the first electron donor is selected from di-($C_1$-$C_6$)alkyl ether. In an embodiment, the first electron donor is selected from dimethyl ether, diethyl ether, dipropyl ether, di-n-butyl ether, butyl propyl ether, diamyl ether, diisoamyl ether, and dihexyl ether. In particular embodiments, the ratio of the first electron donor to the halide-containing magnesium compound is from 10:90 to 50:50 mol % or from 30:70 to 50:50 mol % or from 35:65 to 45:55 mol %.

In particular embodiments, the surface modifier and the optional first electron donor are in a second hydrocarbon solvent when added to the homogenous solution. The second hydrocarbon solvent can be an aromatic or a non-aromatic. Examples of an aromatic second hydrocarbon solvent include toluene and $C_2$-$C_{20}$ alkylbenzene. Examples of a non-aromatic second hydrocarbon solvent include hexane and heptane. In an embodiment, the first hydrocarbon solvent comprises an aromatic solvent, and the second hydrocarbon solvent comprises a non-aromatic solvent. In a certain embodiment, the first hydrocarbon solvent is toluene or a mixture of toluene and hexane, and the second hydrocarbon solvent is hexane. In embodiments, a ratio of the non-aromatic solvent to the aromatic solvent is from 5:95 to 95:5 wt % or 30:70 to 70:30 wt % or 30:70 to 65:35 wt % or 50:50 to 45:55 wt %.

In certain embodiments, the titanium halide treatment includes the steps of mixing the homogenous solution with the first titanium halide compound in the presence of the surface modifier and the optional electron donor, and then heating the mixture to obtain the precipitate.

In certain embodiments, the titanium halide compound used in the preparation of the solid titanium catalyst component is, for example, a tetravalent titanium compound represented by Formula III:

$$Ti(OR)_gX_{4-g} \quad (III)$$

wherein each R group independently represents a hydrocarbon group, preferably an alkyl group having 1 to about 4 carbon atoms, X represents a halogen atom, such as Br, Cl, or I, and 0≤g≤4. Specific examples of the titanium compound include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$; dialkoxytitanium dihalides, such as $Ti(OCH_3)_2Cl_2$, $Ti(OC_2H_5)_2Cl_2$, $Ti(On-C_4H_9)_2Cl_2$ and $Ti(OC_2H_5)_2Br_2$; trialkoxytitanium monohalides, such as $Ti(OCH_3)_3Cl$, $Ti(OC_2H_5)_3Cl$, $Ti(On-C_4H_9)_3Cl$ and $Ti(OC_2H_5)_3Br$; and tetraalkoxytitaniums, such as $Ti(OCH_3)_4$, $Ti(OC_2H_5)_4$, $Ti(OC_3H_7)_3Cl$, $Ti(OC_3H_7)_2Cl_2$, $Ti(OC_3H_7)Cl_3$ and $Ti(On-C_4H_9)_4$.

In one embodiment, the titanium compound is a titanium tetrahalide. These titanium compounds may be used individually or in a combination of two or more. They also can be used as dilutions in hydrocarbon compounds or halogenated hydrocarbons. In a certain embodiment, a ratio of the first titanium halide compound to the halide-containing magnesium compound is from 3:1 to 15:1.

The precipitate is then treated with a second titanium halide compound and a second electron donor to form the solid catalyst component. The second titanium halide compound is selected from any of the compounds described for the first titanium halide compound.

In a certain embodiment, the second titanium halide compound treatment includes the steps of adding the second titanium halide compound and the second electron donor to a solution containing the precipitate to form a solid catalyst composition, and then bringing a temperature of the solid catalyst composition to from 80 to 150° C. and further treating with the second titanium halide compound to form the solid catalyst component. In another embodiment, the second titanium halide compound treatment includes the steps of filtering out the precipitate, adding the second titanium halide compound and the second electron donor in a solvent to the precipitate to form a solid catalyst composition, and bringing a temperature of the solid catalyst composition to from 80 to 150° C. In another embodiment, the second titanium halide compound treatment includes the steps of adding the second titanium halide compound to a solution containing the precipitate; and then bringing a temperature of the solid catalyst composition to from 80 to 150° C. and further treating with the second titanium halide compound and the second electron donor to form the solid catalyst component.

In certain embodiments, the second electron donor is a Lewis acid, which is a chemical species that is an electron-pair acceptor. In more certain embodiments, the second electron donor is at least one selected from carboxylic acid esters, ethers, and ketones. In yet more certain embodiments, the second electron donor is a long-chain dicarboxylic acid ester. In other embodiments, the second electron donor includes at least one ether group and at least one ketone group.

Internal electron donors that may be used as the second electron donor include, for example, diethers, succinates, oxygen-containing electron donors such as organic acid esters, polycarboxylic acid esters, polyhydroxy ester, heterocyclic polycarboxylic acid esters, inorganic acid esters, alicyclic polycarboxylic acid esters and hydroxy-substituted carboxylic acid esters compounds having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, γ-butyrolactone, δ-valerolactone, coumarine, phthalide, ethylene carbonate, ethyl silicate, butyl silicate, vinyltriethoxysilane, phenyltriethoxysilane and diphenyldiethoxysilane; alicyclic polycarboxylic acid esters such as diethyl 1,2-cyclohexanecarboxylate, diisobutyl 1,2-cyclohexanecarboxylate, diethyl tetrahydrophthalate and nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethyl isobutyl phthalate, ethyl-n-butyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimellitate and dibutyl trimellitate, 3,4-furanedicarboxylic acid esters, 1,2-diacetoxybenzene, 1-methyl-2,3-diacetoxybenzene, 2-methyl-2,3-diacetoxybenzene, 2,8-diacetoxynaphthalene, ethylene glycol dipivalate, butanediol pivalate, benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae can be used. In other embodiments, esters are formed between phthalic acid, maleic acid or substituted malonic acid and alcohols having at least about 2 carbon atoms, diesters formed between phthalic acid and alcohols having at least about 2 carbon atoms. Monocarboxylic acid esters represented by RCOOR' where R and R' are hydrocarbonyl groups that can have a substituent, and at least one of them is a branched or ring-containing aliphatic group alicyclic. Specifically, at least one of R and R' may be $(CH_3)_2CH-$, $C_2H_5CH(CH_3)-$, $(CH_3)_2CHCH_2-$, $(CH_3)_3C-$, $C_2H_5CH_2-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

Additional useful internal electron donors that can be used as the second electron donor include internal electron donors containing at least one ether group and at least one ketone group. That is, the internal electron donor compound contains in its structure at least one ether group and at least one ketone group.

Examples of such internal electron donors containing at least one ether group and at least one ketone group include compounds of the following Formula IV:

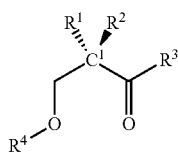

(IV)

wherein $R^1$, $R^2$, $R^3$, and $R^4$ are identical or different, and each represents a substituted or unsubstituted hydrocarbon group. In one embodiment, the substituted or unsubstituted hydrocarbon group includes from 1 to about 30 carbon atoms. In another embodiment, $R^1$, $R^2$, $R^3$, and $R^4$ are identical or different, and each represents a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms. In yet another embodiment, $R^1$, $C^1$ and $R^2$ are a part of a substituted or unsubstituted cyclic or polycyclic structure containing from about 5 to about 14 carbon atoms. In still yet another embodiment, the cyclic or polycyclic structure has one or more substitutes selected from the group consisting of a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms.

Specific examples of internal electron donors containing at least one ether group and at least one ketone group include 9-(alkylcarbonyl)-9'-alkoxymethylfluorene including 9-(methylcarbonyl)-9'-methoxymethylfluorene, 9-(methylcarbonyl)-9'-ethoxymethylfluorene, 9-(methylcarbonyl)-9'-propoxymethylfluorene, 9-(methylcarbonyl)-9'-butoxymethylfluorene, 9-(methylcarbonyl)-9'-pentoxymethylfluorene, 9-(ethylcarbonyl)-9'-methoxymethylfluorene, 9-(ethylcarbonyl)-9'-ethoxymethylfluorene, 9-(ethylcarbonyl)-9'-propoxymethylfluorene, 9-(ethylcarbonyl)-9'-butoxymethylfluorene, 9-(ethylcarbonyl)-9'-pentoxymethylfluorene, 9-(propylcarbonyl)-9'-methoxymethylfluorene, 9-(propylcarbonyl)-9'-ethoxymethylfluorene, 9-(propylcarbonyl)-9'-propoxymethylfluorene, 9-(propylcarbonyl)-9'-butoxymethylfluorene, 9-(propylcarbonyl)-9'-pentoxymethylfluorene, 9-(butylcarbonyl)-9'-methoxymethylfluorene, 9-(butylcarbonyl)-9'-ethoxymethylfluorene, 9-(butylcarbonyl)-9'-propoxymethylfluorene, 9-(butylcarbonyl)-9'-butoxymethylfluorene, 9-(butylcarbonyl)-9'-pentoxymethylfluorene, 9-(pentylcarbonyl)-9'-methoxymethylfluorene, 9-(pentylcarbonyl)-9'-ethoxymethylfluorene, 9-(pentylcarbonyl)-9'-propoxymethylfluorene, 9-(pentylcarbonyl)-9'-butoxymethylfluorene, 9-(pentylcarbonyl)-9'-pentoxymethylfluorene, 9-(hexylcarbonyl)-9'-methoxymethylfluorene, 9-(hexylcarbonyl)-9'-ethoxymethylfluorene, 9-(hexylcarbonyl)-9'-propoxymethylfluorene, 9-(hexylcarbonyl)-9'-butoxymethylfluorene, 9-(hexylcarbonyl)-9'-pentoxymethylfluorene, 9-(octylcarbonyl)-9'-methoxymethylfluorene, 9-(octylcarbonyl)-9'-ethoxymethylfluorene, 9-(octylcarbonyl)-9'-propoxymethylfluorene, 9-(octylcarbonyl)-9'-butoxymethylfluorene, 9-(octylcarbonyl)-9'-pentoxymethylfluorene; 9-(i-octylcarbonyl)-9'-methoxymethylfluorene, 9-(i-octylcarbonyl)-9'-ethoxymethylfluorene, 9-(i-octylcarbonyl)-9'-propoxymethylfluorene, 9-(i-octylcarbonyl)-9'-butoxymethylfluorene, 9-(i-octylcarbonyl)-9'-pentoxymethylfluorene; 9-(i-nonylcarbonly)-9'-methoxymethylfluorene, 9-(i-nonylcarbonyl)-9'-ethoxymethylfluorene, 9-(i-nonylcarbonyl)-9'-propoxymethylfluorene, 9-(i-nonylcarbonyl)-9'-butoxymethylfluorene, 9-(i-nonylcarbonyl)-9'-pentoxymethylfluorene; 9-(2-ethyl-hexylearbonyl)-9'-methoxymethylfluorene, 9-(2ethyl-hexylcarbonyl)-9'-ethoxymethylfluorene, 9-(2-ethyl-hexylcarbonyl)-9'-propoxymethylfluorene, 9-(2-ethyl-hexylcarbonyl)-9'-butoxymethylfluorene, 9-(2-ethyl-hexylcarbonyl)-9'-pentoxymethylfluorene, 9-(phenylketone)-9'-methoxymethylfluorene, 9-(phenylketone-9'-ethoxymethylfluorene, 9-(phenylketone)-9'- propoxymethylfluorene, 9-(phenylketone)-9'-butoxymethylfluorene, 9-(phenylketone)-9'-pentoxymethylfluorene, 9-(4-methylphenylketone)-9'-methoxymethylfluorene, 9-(3-methylphenylketone)-9'-methoxymethylfluorene, 9-(2-methylphenylketone)-9'-methoxymethylfluorene.

Additional examples include: 1-(ethylcarbonyl)-1'-methoxymethylcyclopentane, 1-(propylcarbonyl)-1'-methoxymethylcyclopentane, 1-(i-propylcarbonyl)-1'-methoxymethylcyclopentane, 1-(butylcarbonyl)-1'-methoxymethylcyclopentane, 1-(i-butylcarbonyl)-1'-methoxymethylcyclopentane. 1-(pentylcarbonyl)-1'-methoxymethylcyclopentane, 1-(i-pentylcarbonyl)-1'-methoxymethylcyclopentane, 1-(neopentylcarbonyl)-1'-methoxymethylcyclopentane, 1-(hexhylcarbonyl)-1'-methoxymethylcyclopentane, 1-(2-ethylhexylcarbonyl)-1'-methoxymethylcyclopentane, 1-(octylcarbonyl)-1'-methoxymethylcyclopentane, 1-(i-octylcarbonyl)-1'-methoxymethylcyclopentane, 1-(i-nonylcarbonyl)-1'-methoxymethylcyclopentane. 1-(ethylcarbonyl)-1'-methoxymethyl-2-methylcyclopentane, 1-(propylcarbonyl)-1'-methoxymethyl-2-methylcyclopentane, 1-(i-propylcarbonyl)-1'-methoxymethyl-2methyl-cyclopentane, 1-(butylcarbonyl)-1'-methoxymethyl-2-methylcyclopentane, 1-(i-butylcarbonyl)-1'-methoxymethyl-2-methylcyclopentane. 1-(pentylcarbonyl)-1'-methoxymethyl-2-methylcyclopentane, 1-(i-pentylcarbonyl)-1'-methoxymethyl-2-methylcyclopentane, 1-(neopentylcarbonyl)-1'-methoxymethyl-2-methylcyclopentane, 1-(hexhylcarbonyl)-1'-methoxymethyl-2-methylcyclopentane, 1-(2-ethylhexylcarbonyl)-1'-methoxymethyl-2-methyl cyclopentane, 1-(octylcarbonyl)-1'-methoxymethyl-2-methyl cyclopentane, 1-(i-octylcarbonyl)-1'-methoxymethyl-2-methyl cyclopentane, 1-(i-nonylcarbonyl)-1'-methoxymethyl-2-methyl cyclopentane, 1-(ethylcarbonyl)-1'-methoxymethyl-2,5-dimethylcyclopentane, 1-(propylcarbonyl)-1'-methoxymethyl-2,5-dimethylcyclopentane, 1-(i-propylcarbonyl)-1'-methoxymethyl-2,5-dimethyl-cyclopentane, 1-(butylcarbonyl)-1'-methoxymethyl-2,5-di-cyclopentane, 1-(i-butylcarbonyl)-1'-methoxymethyl-2,5-dimethylcyclopentane. 1-(pentylcarbonyl)-1'-methoxymethyl-2,5-dimethylcyclopentane, 1-(i-pentylcarbonyl)-1'-methoxymethyl-2,5-dimethylcyclopentane, 1-(neopentylcarbonyl)-1'-methoxymethyl-2,5-dimethylcyclopentane, 1-(hexhylcarbonyl)-1'-methoxymethyl-2,5-dimethylcyclopentane, 1-(2-ethylhexylcarbonyl)-1'-methoxymethyl-2,5-dimethyl cyclopentane, 1-(octylcarbonyl)-1'-methoxymethyl-2,5-dimethyl cyclopentane, 1-(i-octylcarbonyl)-1'-methoxymethyl-2,5-dimethyl cyclopentane, 1-(i-nonylcarbonyl)-1'-methoxymethyl-2,5-dimethyl cyclopentane, 1-(ethylcarbonyl)-1'-methoxymethylcyclohexane, 1-(propylcarbonyl)-1'-methoxymethylcyclohexane, 1-(i-propylcarbonyl)-1'-methoxymethylcyclohexane, 1-(butylcarbonyl)-1'-methoxymethylcyclohexyl, 1-(i-butylcarbonyl)-1'-methoxymethylcyclohexane. 1-(pentylcarbonyl)-1'-methoxymethylcyclohexane, 1-(i-pentylcarbonyl)-1'-methoxymethylcyclohexane, 1-(neopentylcarbonyl)-1'-methoxymethylcyclohexane, 1-(hexhylcarbonyl)-1'-methoxymethylcyclohexane, 1-(2-ethylhexylcarbonyl)-1'-methoxymethylcyclohexane, 1-(octylcarbonyl)-1'-methoxymethylcyclohexane, 1-(i-octylcarbonyl)-1'-methoxymethylcyclohexane, 1-(i-nonylcarbonyl)-1'-methoxymethylcyclohexane. 1-(ethylcarbonyl)-1'-methoxymethyl-2-methylcyclohexane, 1-(propylcarbonyl)-1'-methoxymethyl-2-methylcyclohexane, 1-(i-propanecarbonyl)-1'-methoxymethyl-2-methyl-cyclohexane, 1-(butylcarbonyl)-1'-methoxymethyl-2-methylcyclohexane, 1-(i-butylcarbonyl)-1'-methoxymethyl-2-methylcyclohexane. 1-(pentylcarbonyl)-1'-methoxymethyl-2-methylcyclohexane, 1-(i-pentylcarbonyl)-1'-methoxymethyl-2-methylcyclohexane, 1-(neopentylcarbonyl)-1'-methoxymethyl-2-methylcyclohexane, 1-(hexhylcarbonyl)-1'-methoxymethyl-2-methylcyclohexane, 1-(2-ethylhexylcarbonyl)-1'-methoxymethyl-2-methyl cyclohexane, 1-(octylcarbonyl)-1'-methoxymethyl-2-methyl cyclohexane, 1-(i-octylcarbonyl)-1'-methoxymethyl-2-methyl cyclohexane, 1-(i-nonylcarbonyl)-1'-methoxymethyl-2-methyl cyclohexane, 1-(ethylcarbonyl)-1'-methoxymethyl-2,6-dimethylcyclohexane, 1-(propylcarbonyl)-1'-methoxymethyl-2,6-dimethylcyclohexane, 1-(i-propylcarbonyl)-1'-methoxymethyl-2,6-dimethyl-cyclohexane, 1-(butylcarbonyl)-1'-methoxymethyl-2,6-dimethyl-cyclohexane, 1-(i-butylcarbonyl)-1'-methoxymethyl-2,6-dimethylcyclohexane. 1-(pentylcarbonyl)-1'-methoxymethyl-2,6-dimethylcyclohexane, 1-(i-pentylcarbonyl)-1'-methoxymethyl-2,6-dimethylcyclohexane, 1-(neopentylcarbonyl)-1'-methoxymethyl-2,6-dimethylcyclohexane, 1-(hexhylcarbonyl)-1'-methoxymethyl-2,6-dimethylcyclohexane, 1-(2-ethylhexylcarbonyl)-1'-methoxymethyl-2,6-dimethyl cyclohexane, 1-(octylcarbonyl)-1'-methoxymethyl-2,6-dimethyl cyclohexane, 1-(i-octylcarbonyl)-1'-methoxymethyl-2,6-dimethyl cyclohexane, 1-(i-nonylcarbonyl)-l-methoxymethyl-2,6-dimethyl cyclohexane, 2,5-dimethyl-3-ethylcarbonyl-3'-methoxymethylpentane, 2,5-dimethyl-3-propylcarbonyl-3'-methoxymethylpentane, 2,5-dimethyl-3-propylcarbonyl-3'-methoxymethylpentane, 2,5-dimethyl-3-butylcarbonyl-3'-methoxymethylpentane, 2,5-dimethyl-3-i-butylcarbonyl-1'-methoxymethylcyclohexyl. 2,5-dimethyl-3-pentylcarbonyl-3'-methoxymethylpentane, 2,5-dimethyl-3-i-pentylcarbonyl-3'-methoxymethylpentane, 2,5-dimethyl-3-neopentylcarbonyl-3'-methoxymethylpentane, 2,5-dimethyl-3-hexhylcarbonyl-3'-methoxymethylpentane, 2,5-dimethyl-3-2-ethylhexylcarbonyl-3'-methoxymethylpentane, 2,5-dimethyl-3-octylcarbonyl-3'-methoxymethylpentane, 2,5-dimethyl-3-i-octylcarbonyl-3'-methoxymethylpentane, and 2,5-dimethyl-3-i-nonylcarbonyl-3'-methoxymethylpentane.

In one embodiment, an internal electron donor that can be used as the second electron donor is one or more selected from dialkyl-4-alkylphthalates including diisobutyl-4-methylphthalate and di-n-butyl-4-ethylphthalate; diisobutyl cyclopentane-1,1-dicarboxylate; and isobutyl 1-(methoxymethyl)cyclopentanecarboxylate.

Additional useful internal electron donors that can be used as the second electron donor include 1,8-naphthyl diaryloate compounds that have three aryl groups connected by ester linkages (three aryl groups connected by two ester linkages, such as an aryl-ester linkage-naphthyl-ester linkage-aryl compound). 1,8-naphthyl diaryolate compounds can be formed by reacting a naphthyl dialcohol compound with an aryl acid halide compound. Methods of forming an ester product through reaction of an alcohol and acid anhydride are well known in the art.

While not wishing to be bound by any theory, it is believed that the 1,8-naphthyl diaryloate compounds have a chemical structure that permits binding to both a titanium compound and a magnesium compound, both of which are typically present in a solid titanium catalyst component of an olefin polymerization catalyst system. The 1,8-naphthyl diaryloate compounds also act as internal electron donors, owing to the electron donation properties of the compounds, in a solid titanium catalyst component of an olefin polymerization catalyst system.

In one embodiment, the 1,8-naphthyl diaryloate compounds are represented by chemical Formula V:

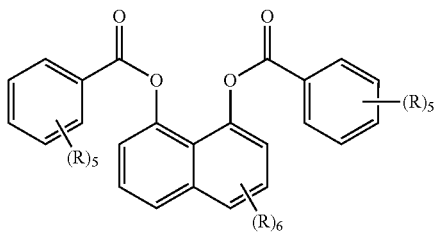

(V)

wherein each R is independently hydrogen, halogen, alkyl having 1 to about 8 carbon atoms, phenyl, arylalkyl having 7 to about 18 carbon atoms, or alkylaryl having 7 to about 18 carbon atoms. In another embodiment, each R is independently hydrogen, alkyl having 1 to about 6 carbon atoms, phenyl, arylalkyl having 7 to about 12 carbon atoms, or alkylaryl having 7 to about 12 carbon atoms.

General examples of 1,8-naphthyl diaryloate compounds include 1,8-naphthyl di(alkylbenzoates); 1,8-naphthyl di(dialkylbenzoates); 1,8-naphthyl di(trialkylbenzoates); 1,8-naphthyl di(arylbenzoates); 1,8-naphthyl di(halobenzoates); 1,8-naphthyl di(dihalobenzoates); 1,8-naphthyl di(alkylhalobenzoates); and the like.

Specific examples of 1,8-naphthyl diaryloate compounds include 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; 1,8-naphthyl di-3,5-di-t-butylbenzoate; and the like.

The internal electron donors used as the second electron donor can be used individually or in combination. In employing the internal electron donor, they do not have to be used directly as starting materials, but compounds convertible to the electron donors in the course of preparing the titanium catalyst components may also be used as the starting materials.

Solid catalyst components made by the processes disclosed above have a spherical or spheroidal shape having an average largest dimension of from 5-200 μm.

Catalyst particle morphology can be represented by their polymer particle morphology. The three parameters of polymer particle morphology (sphericity, symmetry and aspect ratio) collected by a Camsizer instrument are used to characterize the catalyst morphology.

Camsizer Characteristics:
Sphericity $$SPHT = \frac{4\pi A}{P^2} = \text{Circularity } 2(ISO\ 9276\text{-}6)$$

P—measured perimeter/circumference of a particle projection
A—measured area covered by a particle projection
For an ideal sphere SPHT is expected to be as 1. Otherwise it is smaller than 1.
Symmetry $$Symm_{0.3} = \frac{1}{2}\left(1 + \min\left(\frac{r_1}{r_2}\right)\right)$$

$r_1$ and $r_2$ are distances from the centre of area to the borders in the measuring direction. For asymmetric particles Symm is <1.
If the centre of area is outside the particle i.e.

$$\frac{r_1}{r_2} < 0$$

Symm is <0.5
$x_{Ma} = r_1 + r_2$ "Symm" is minimum value of measured set of symmetry values from different directions
Aspect Ratio $$b/l_{0,2,3} = \frac{x_{c\ min}}{x_{Fe\ max}};$$

$x_{c\ min}$ and $x_{Fe\ max}$ out of the measured set of $x_c$ and $x_{Fe}$ values The catalyst morphology characteristics such as sphericity, symmetry and aspect ratio characteristics are increased when a cold hold is added to the temperature ramp profile, followed by slow ramping. In some processes the sphericity, symmetry and aspect ratio are higher than 0.8, or higher than 0.85, or higher than 0.88, or higher than 0.90, or higher than 0.92, or higher than 0.95.

The solid catalyst component may be used after being diluted with an inorganic or organic compound such as a silicon compound or an aluminum compound.

The catalyst system may contain at least one organoaluminum compound in addition to the solid catalyst component. Compounds having at least one aluminum-carbon bond in the molecule can be used as the organoaluminum compound. Examples of organoaluminum compounds include compounds of the following chemical formula (VI):

$$AlR_nX_{3-n} \qquad (VI)$$

In formula (VI), R independently represents a hydrocarbon group usually having 1 to about 20 carbon atoms, X represents halogen atoms, and 0<n≤3.

Specific examples of the organoaluminum compounds represented by formula (VI) include, but are not limited to trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound can be used in the catalyst system in an amount that the mole ratio of aluminum to titanium (from the solid catalyst component) is from about 5 to about 1. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid catalyst component. This organosilicon compound is sometimes termed as an external electron donor. The organosilicon compound contains silicon having at least one hydrogen ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a controllable molecular weight distribution and controllable crystalinity while retaining high performance with respect to catalytic activity.

The organosilicon compound is used in the catalyst system in an amount such that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ration of the organoaluminum compound to the organosilicon compound is from about 7 to about 35.

In one embodiment, the organosilicon compound is represented by chemical formula VII:

$$R_nSi(OR')_{4-n} \quad (VII)$$

wherein each R and R' independently represent a hydrocarbon group, and n is 0≤n<4.

Specific examples of the organosilicon compound of formula (VII) include, but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropy ltrimethoxysilane, methyltriethoxysilane, ethyltriethoxysilane, vinyltriethoxysilane, t-butyltriethoxysilane, nbutyltriethoxysilane, iso-butyltriethoxysilane, phenyltriethoxysilane, gammaamniopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norboranetriethoxysilane, 2-norboranemethyldimethoxysilane, ethyl silicate, butyl silicate, trimethylphenoxysilane, and methyltriallyloxysilane.

In another embodiment, the organosilicon compound is represented by chemical formula (VIII):

$$SiRR'_m(OR'')_{3-m} \quad (VIII)$$

In the above formula (VIII), 0≤m<3, such as 0≤m<2; and R independently represents a cyclic hydrocarbon or substituted cyclic hydrocarbon group. Specific examples of the group R include, but are not limited to cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tetiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In formula (VIII), R' and R'' are identical or different and each represents a hydrocarbon. Examples of R' and R'' are alkyl, cycloalkyl, aryl and aralkyl groups having 3 or more carbon atoms. Furthermore, R and R' may be bridged by an alkyl group, etc. General examples of organosilicon compounds are those of formula (VIII) in which R is cyclopentyl group, R' is an alkyl group such as methyl or cyclopentyl group, and R'' is an alkyl group, particularly a methyl or ethyl group.

Specific examples of organosilicon compounds of formula (VIII) include, but are not limited to trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis (2-methylcyclopentyl)dimethoxysilane, bis(3-tertiary butylcyclopentyl)dimethoxysilane, bis(2,3-dimethylcyclopentyl) dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl- 2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins can be carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid catalyst component is usually employed in combination with at least a portion of the organoaluminum compound. This may be carried out in the presence of part or the whole of the organosilicon compound (external electron donor compound). The concentration of the catalyst system used in the preliminary polymerization may be much higher than that in the reaction system of the main polymerization.

In preliminary polymerization, the concentration of the solid catalyst component in the preliminary polymerization is usually from about 0.01 to about 200 millimoles, or from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific examples of the inert hydrocarbon medium include, but are not limited to aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. In certain embodiments, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20 degrees Celsius to about 100 degrees Celsius. In another embodiment, the temperature is from about −10 degrees Celsius to about 80 degrees Celsius. In yet another embodiment, the temperature is from about 0 degrees Celsius to about 40 degrees Celsius.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decaliter at 135 degrees Celsius, of at least about 0.2 dl/g, or from about 0.5 to 10 dl/g.

In one embodiment, the preliminary polymerization is carried out so that from about 0.1 g to about 1,000 g of a polymer is formed per gram of the solid catalyst component of the catalyst system. In another embodiment, the preliminary polymerization is carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid catalyst component, the organoaluminum compound and the organosilicon compound (external electron donor compound).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In exemplary processes, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, or at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particles shape of the resulting polymer becomes spherical, and in the case of slurry polymerization, the slurry attains excellent characteristics while in the case of gas phase polymerization, the polymer seed bed attains excellent characteristics. Furthermore, in these embodiments, a polymer having a high stereoregularity index can be produced with a high catalytic efficiency by polymerizing an alpha-olefin having at least 3 carbon atoms. Accordingly, when producing the propylene copolymer, the resulting copolymer powder or the copolymer becomes easy to handle.

In the homopolymerization of these olefins, a polyunsaturated compound such as conjugated diene or non-conjugated diene may be used as a comonomer. Examples of comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers. The main polymerization of an olefin is carried out usually in the gaseous or liquid phase. In one embodiment, polymerization (main polymerization) employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid catalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid catalyst component in an amount of from 0.005 to about 0.5 milimoles calculated as Ti atom per liter of the volume of the polymerization zone, the organoaluminum compound in an amount from about 5 to about 500 moles per mole of titanium atoms in the solid catalyst component, and the organosilicon compound in an amount from about 0.01 to about 2 moles calculated as Si atoms in the organosilicon compound per mole of the metal atoms in the organoaluminum compound. In yet another embodiment, polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system can be increased according to the above methods.

In one embodiment, the polymerization temperature is from about 20 degree Celsius to about 200 degrees Celsius. In another embodiment, the polymerization temperature is from about 50 degree Celsius to about 180 degrees Celsius. In one embodiment, the polymerization pressure is typically from atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact polymer.

The alpha-olefin having 2 carbon atoms is ethylene, and examples of the alpha-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may be carried out in two or more stages under the same or different polymerization conditions.

In one embodiment, the polymerization in a second stage is carried out such that the mole ratio of propylene to the other alpha-olefin(s) is from about 10/90 to about 90/10. In another embodiment, the polymerization in a second stage is carried out such that the mole ratio of propylene to the other alpha-olefin(s) is from about 20/80 to about 80/20. In yet another embodiment, the polymerization in a second stage is carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above described block copolymer. This propylene copolymer can contain from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another embodiment, copolymers made with the catalyst system contain from about 50% to about 99% by weight poly-alpha-olefins and from about 1% to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiment are applicable.

In one embodiment, the catalyst efficiency (measured as kilogram of polymer produced per gram of catalyst) of the catalyst system is at least about 30. In another embodiment, the catalyst efficiency of the catalyst system is at least about 60.

The catalysts/methods discussed above can in some instances lead to the production of poly-alpha-olefins having melt flow indexes (MFI) from about 0.1 to about 100. The MFI is measured according to ASTM standard D1238. In another embodiment, poly-alpha-olefins having an MFI from about 5 to about 30 are produced. In one embodiment, an impact polypropylene-ethylenepropylene rubber product has an MFI from about 4 to about 10. In another embodiment, an impact polypropyleneethylenepropylene rubber product has an MFI from about 5 to about 9. In some instances a relatively high MFI indicates relatively high catalyst efficiency is obtainable.

The catalysts/methods described above can in some instances lead to the production of poly-alpha-olefins having bulk densities (BD) of at least about 0.3 cc/g. In another embodiment, poly-alpha-olefins having a BD of at least about 0.4 cc/g are produced.

In one embodiment, an impact polypropylene-ethylenepropylene rubber product having a BD of at least about 0.3 cc/g is produced. In another embodiment, an impact polypropylene-ethylenepropylene rubber product having a BD of at least about 0.4 cc/g is produced.

The catalysts/methods described above can lead to the production of poly-alphaolefins having a relatively narrow molecular weight distribution. Polydispersive Index (PI) is strictly connected with the molecular weight distribution of the polymer. PI is calculated as the weight average molecular weight divided by the number average molecular weight, PI=Mw/Mn. In one embodiment, the PI of a polypropylene polymer made with the catalyst system is from about 2 to about 12. In another embodiment, the PI of a polypropylene polymer made with the catalyst system is from about 5 to about 11.

Embodiments of the present invention can lead to the production of a propylene block copolymer and impact copolymers including polypropylene based impact copolymer having one or more excellent melt-flowability, moldability, desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid catalyst component according to embodiments of the present invention yields catalysts simultaneously having high catalytic efficiency, and one or more of excellent melt-flowability, extrudability, moldability, rigidity, elasticity and impact strength.

When making an impact copolymer, polypropylene can be formed in a first reactor while an ethylene propylene rubber can be formed in a second reactor. In this polymerization, the ethylene propylene rubber in the second reactor is formed with the matrix (and particularly within the pores) of the polypropylene formed in the first reactor. An intimate mixture of an impact copolymer is formed, wherein the polymer product appears as a single polymer product. Such an intimate mixture cannot be made by simply mixing a polypropylene product with an ethylene propylene rubber product. The systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process.

With respect to any figure or numerical range for a given characteristic, a figure or a parameter from one range may be combined with another figure or a parameter from a different range for the same characteristic to generate a numerical range. Other than in the operating examples, or where otherwise indicated, all numbers, values and/or expressions referring to quantities of ingredients, reaction conditions, etc., used in the specification and claims are to be understood as modified in all instances by the term "about."

The following examples illustrate embodiments of the present invention. Unless otherwise indicated in the following examples and elsewhere in the specification and claims, all parts and percentages are by weight, all temperatures are in degrees Celsius, and pressure is at or near atmospheric.

Abbreviations and Definitions Related to the Examples

"D10" represents the size of particles (diameter), wherein 10% of particles are less than that size, "D50" represents the size of particles, wherein 50% of particles are less than that size, and "D90" represents the size of particles, wherein 90% of particles are less than that size. "Span" represents the distribution of the particle sizes of the particles. The value can be calculated according to the following formula:

$$\mathrm{Span} = \frac{D[v, 0.9] - D[v, 0.1]}{D[v, 0.5]}$$

"b/l" represents polymer aspect ratio measured by the Camsizer. The catalyst morphology was gauged by the polymer morphology since polymer morphology is a replica of the catalyst morphology. The "INT," in for example "INT D10," represents intermediate, and refers to the particle size or span of the catalyst component particles prior to activation. "Final," in for example "FINAL D10," refers to the particle size or span of the activated catalyst particles.

Propylene Polymerization

Where catalysts of the examples are used in a method of propylene polymerization the following method is used. The reactor was baked at 100° C. under nitrogen flow for 30 minutes prior to the polymerization run. The reactor was cooled to 30-35° C. and cocatalyst (1.5 cc of 25 wt % triethylaluminum (TEAl)), C-donor [cyclohexylmethydimethoxysilane] (1 cc), hydrogen (3.5 psi) and liquid propylene (1500 cc) were added in this sequence into the reactor. The catalyst (10 mg) loaded as mineral oil slurry was pushed into the reactors using high pressure nitrogen. The polymerization was performed for one hour at 70° C. After the polymerization, the reactors were cooled to 22° C., vented to atmosphere pressure and the polymer was collected.

Example 1 Demonstrates Preparing a Spherical Catalyst Support Using Dibutyl Ether as a First Electron Donor 13.2 g 24 mesh Magnesium chloride, 14.25 g epichlorohydrin and 36.3 g of tributylphosphate were dissolved in 59.5 g toluene at 60° C. for 5 hours with agitation at 400 rpm. Then 4.36 g of phthalic anhydride and 59.5 g hexane were added and the solution was held for 1 hour at 60° C. The solution was cooled to 22° C. and 6 g VISCOPLEX® in 40 g of hexane and 8 g dibutyl ether in 13 g of hexane were added to the reaction mixture. The solution was then cooled down to 0° C. and 287.8 ml of TiCl$_4$ was added over 90 min while maintaining agitation at 500 rpm and the temperature at 0° C. The agitation speed was dropped to 400 rpm and the reaction temperature was increased to 10° C. in 30 min and held at 10° C. for 2 hours. After that, the reaction temperature was increased to 85° C. in 70 min and held for 30 min. The mother liquor was filtered and the solids were washed twice with 150 ml toluene at 85° C. A digital image of a microscopic view of the catalyst support is shown in FIG. 1. The resulting catalyst support was characterized by particle size: INT D10: 19.1 μm, INT D50: 29.0 μm, INT D90: 40.5 μm, INT Span 0.741, b/l: 0.840.

Figure 2:
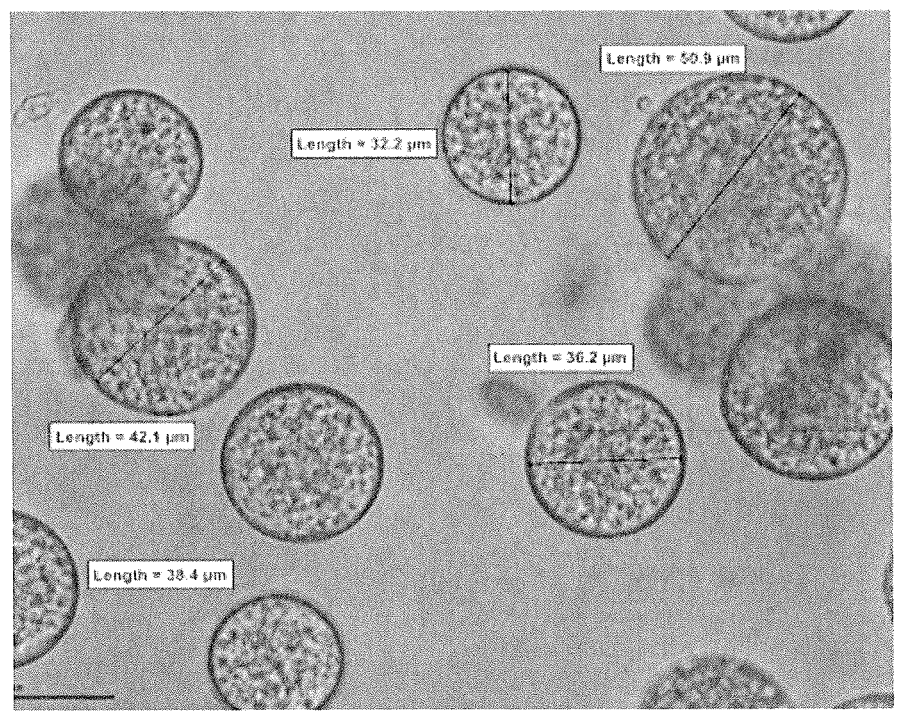
FIG. 2 shows a microscopic view of the catalyst support of Example 2.

Example 2 Demonstrates Preparing a Spherical Catalyst Support Using Diisoamyl Ether as a First Electron Donor 13.2 g 24 mesh Magnesium chloride, 14.25 g epichlorohydrin and 36.3 g of tributylphosphate were dissolved in 59.5 g toluene at 60° C. for 5 hours with agitation at 400 rpm. Then 5.1 g of phthalic anhydride and 49.0 g hexane were added and the solution was held for 1 hour at 60 C. The solution was cooled to 22° C. and 8.5 g VISCOPLEX® in 40 g of hexane and 8 g diisoamyl ether in 13 g of hexane were added to the reaction mixture. The solution was then cooled down to 0° C. and 287.8 ml of TiCl$_4$ was added over 90 min while maintaining agitation at 500 rpm and the temperature of 0° C. The agitation speed was dropped to 400 rpm and the reaction temperature was increased to 10° C. in 30 min and held at 10° C. for 2 hours. After that, the reaction temperature was increased to 85 C. in 70 min and held for 30 min. The mother liquor was filtered and the solids were washed twice with 150 ml toluene at 85° C. A digital image of a microscopic view of the catalyst support is shown in FIG. 2. The resulting catalyst support was characterized by particle size: INT D10: 25.0μ, INT D50: 37.5μ, INT D90: 52.0μ, INT Span 0.720, b/l: 0.861.

Example 3 Demonstrates Preparing a Spherical Catalyst Support Using Dihexyl Ether as a First Electron Donor 5.0 g fine Magnesium chloride, 5.0 g epichlorohydrin and 12.74 g of tributylphosphate were dissolved in a mixture of 22.5 g toluene and 22.5 g hexane at 60° C. for 5 hours with agitation at 400 rpm. Then 1.65 g of phthalic anhydride was added and the solution was held for 1 hour at 60° C. The solution was cooled to 22° C. and 3 g VISCOPLEX® in 15 g of hexane and 3.8 g dihexyl ether in 5 g of hexane were added to the reaction mixture. The agitation speed was increased to 500 rpm and the solution was then cooled down to 0° C. 109 ml of TiCl$_4$ was added over 90 min while maintaining agitation at 500 rpm and the temperature of 0° C. The reaction temperature was increased to 10° C. in 30 min and held at 10 C. for 2 hours. After that, the reaction temperature was increased to 50° C. and held for 30 min, then to 85° C. and held for 30 min. The mother liquor was filtered and the solids were washed twice with 60 ml toluene at 85° C. The resulting catalyst support was characterized by particle size: INT D10: 22.7μ, INT D50: 35.4μ, INT D90: 50.9μ, INT Span 0.795, b/l: 0.877.

Example 4 Demonstrates Preparing a Spherical Catalyst Support Using Dibutyl Ether as a First Electron Donor 13.2 g fine Magnesium chloride, 13.2 g epichlorohydrin and 33.6 g of tributylphosphate were dissolved in a mixture of 59 g toluene and 59 g hexane at 60° C. for 5 hours with agitation at 400 rpm. Then 4.36 g of phthalic anhydride was added and the solution was held for 1 hour at 60° C. The solution was cooled to 22° C. and 7.1 g VISCOPLEX® in 40 g of hexane and 13.2 g dibutyl ether in 13 g of hexane were added to the reaction mixture. The solution was then cooled down to 0° C., and 287 ml of TiCl$_4$ was added over 90 min while maintaining agitation at 500 rpm and the temperature at 0° C. The agitation speed was dropped to 400 rpm. The reaction temperature was increased to 10° C. in 30 min and held at 10° C. for 2 hours. After that, the reaction temperature was increased to 50° C. and held for 30 min, then to 85° C. and held for 30 min. The mother liquor was filtered and the solids were washed twice with 60 ml toluene at 85° C. The resulting catalyst support was characterized by particle size: INT D10: 20.9μ, INT D50: 29.4μ, INT D90: 41.2μ, Span 0.691, b/l: 0.824.

Example 5 Demonstrates Preparing a Spherical Catalyst Support Using Diisoamyl Ether as a First Electron Donor A catalyst component was made by the method of Example 4, except 13.2 g diisoamlyl ether was used. The resulting catalyst support was characterized by particle size: INT D10: 29.89μ, INT D50: 58.8μ, INT D90: 100.1μ, INT Span 1.194, b/l: 0.800.

Example 6 Demonstrates Preparing a Spherical Catalyst Support Using Dihexyl Ether as a First Electron Donor A catalyst component was made by the method of Example 4, except 13.2 g dihexyl ether was used. The resulting catalyst support was characterized by particle size: INT D10: 23.89μ, INT D50: 38.5μ, INT D90: 60.6μ, INT Span 0.955, b/l: 0.761.

Example 7 Demonstrates Preparing a Spherical Catalyst Support Using Diisoamyl Ether as a First Electron Donor and Succinic Anhydride Instead of Phthalic Anhydride 11.2 g 24 mesh Magnesium chloride, 13.2 g epichlorohydrin and 33.6 g of tributylphosphate were dissolved in a mixture of 70 g toluene and 49 g hexane mixture at 60° C. for 5 hours with agitation at 400 rpm. Then 2.9 g of succinic anhydride was added and the solution was held for 1 hour at 60° C. The solution was cooled to 22° C. and 8 g VISCOPLEX® in 40 g of hexane and 9 g diisoamyl ether in 13 g of hexane were added to the reaction mixture. The solution was then cooled down to 0° C., and 287.8 ml of TiCl$_4$ was added over 90 min while maintaining agitation at 500 rpm and the temperature at 0° C. The agitation speed was dropped to 400 rpm, and the reaction temperature was increased to 10° C. in 30 min and held at 10° C. for 2 hours. After that, the reaction temperature was increased to 85° C. in 70 min and held for 30 min. The agitation speed was dropped to 400 rpm. The mother liquor was filtered and the solids were washed twice with 150 ml toluene at 85° C. The resulting catalyst support was characterized by particle size: INT D10: 76.17μ, INT D50: 103.0μ, INT D90: 140.0μ, INT Span 0.624.

Example 8 Demonstrates Preparing a Spherical Catalyst Support Using Diisoamyl Ether as a First Electron Donor and Succinic Anhydride Instead of Phthalic Anhydride A catalyst support was made by the method of Example 7, except the 2.0 g of succinic anhydride was used. The resulting catalyst support was characterized by particle size: INT D10: 20.8µ, INT D50: 35.0µ, INT D90: 56.3µ, INT Span 1.013, b/l 0.877.

Examples 9-12

Demonstrate the Effect of Agitation Speed During the Ramping from 0° C.

In each of the examples, a catalyst support was made by the method of Example 1 except the agitation speed during the ramping from 0° C. was varied as described in Table 1 below. The particle size and span for the resulting catalyst supports are shown in Table 1 below. The particle size was controlled by the agitation speed.

Examples 13-14 Demonstrate the Effect of Agitation Speed During the TiCl$_4$ Addition In each of the examples, a catalyst support was made by the method of Example 1, except the agitation speed during the TiCl$_4$ addition was varied as described in Table 1 below. The particle size and span for the resulting catalyst supports are shown in Table 1 below. It was determined that the agitation speed during the TiCl$_4$ addition did not substantially affect the particle size.

TABLE 1

Experiments with agitation speeds

| EX | TiCl$_4$ addition rpm | Ramping rpm | D10 (µ) | D50 (µ) | D90 (µ) | Span |
|---|---|---|---|---|---|---|
| 9 | 500 | 200 | 31.4 | 43.7 | 58.2 | 0.613 |
| 10 | 500 | 350 | 31.4 | 43.7 | 58.2 | 0.613 |
| 11 | 500 | 600 | 13.5 | 23.0 | 33.8 | 0.884 |
| 12 | 500 | 800 | 11.5 | 18.8 | 29.2 | 0.940 |
| 13 | 800 | 400 | 24.4 | 33.6 | 44.4 | 0.595 |
| 14 | 500 | 400 | 21.6 | 30.0 | 39.8 | 0.605 |

Examples 15-17 below describe the effect of the amount of phthalic anhydride on the resulting catalyst support. The catalyst particle was much bigger and the particle became elongated when the phthalic anhydride amount was 4.32 g under the condition studied with diisoamylether. Above 4.7 g, the catalyst particle is spherical and in the range of 35-45 µm.

Example 15 Demonstrates Preparing a Spherical Catalyst Support Using Diisoamyl Ether as a First Electron Donor and 4.32 g Phthalic Anhydride A catalyst component was made by the method of Example 2, except the phthalic anhydride amount was 4.32 g. The resulting catalyst support was characterized by particle size: INT D10: 37.3µ, INT D50: 75.6µ, INT D90: 156µ, INT Span 1.573.

Example 16 Demonstrates Preparing a Spherical Catalyst Component Using Diisoamyl Ether as a First Electron Donor and 4.9 g Phthalic Anhydride A catalyst component was made by the method of Example 2, except the phthalic anhydride amount was 4.9 g. The resulting catalyst support was characterized by particle size: INT D10: 27.9µ, INT D50: 44.1µ, INT D90: 74.6µ, INT Span 1.060.

Example 17 Demonstrates Preparing a Spherical Catalyst Support Using Diisoamyl Ether as a First Electron Donor and 4.7 g Phthalic Anhydride A catalyst support was made by the method of Example 2, except the phthalic anhydride amount was 4.7 g. The resulting catalyst support was characterized by particle size: INT D10: 26.2µ, INT D50: 40.4µ, INT D90: 66.4µ, INT Span 0.997.

Examples 18-20 below are methods of activating catalyst support for use in polymerizing propylene.

Example 18 Demonstrates Activating a Catalyst Support that was Prepared Using Dibutyl Ether as a First Electron Donor The catalyst support of example 1 was activated for use in Ziegler-Natta catalyst system as follows. The support was contacted with 265 mL of a 7.5% vol TiCl$_4$/toluene mixture and 2 g of diisibutylphthalate at 85° C. for 1 hour. The supernatant was filtered and the solids were contacted again with 265 ml of a 7.5% vol TiCl$_4$/toluene mixture and 4 g of diisibutylphthalate and agitated at 120° C. for 1 hour. Then the solid was contacted three times with 265 ml of a 7.5% vol TiCl$_4$/Toluene mixture at 110° C. for 30 min. The supernatant was decanted and the solids were washed four times with 160 ml of hexane.

Example 19 Demonstrates Activating a Catalyst Support that was Prepared Using Diisoamyl Ether as a First Electron Donor and 4.32 g Phthalic Anhydride The catalyst support of example 15 was activated in the same method as used in Example 18.

Example 20 Demonstrates Activating a Catalyst Support that was Prepared Using Diisoamyl Ether The catalyst support of example 2 was activated for use in Ziegler-Natta catalyst system as follows. During the ramping to 85° C., 2.72 g of diisooctylphtalate was added and heated for 1 hour. The supernatant was filtered and 240 ml of 10 vol % TiCl$_4$/toluene solution and 6.32 g of diisooctylphtalate were added to the reactor and heated at 80° C. for 1 hour. The solids were washed with toluene three times (200 ml, 10 min). The solids were then contacted with 264 ml of 10 vol % TiCl$_4$/Toluene and 4.80 g of diisooctylphtalate for 1 hour at 95° C. The supernatant was filtered and the solids were contacted with 264 ml of 10 vol % TiCl$_4$/Toluene at 110° C. for 30 min for three times. The supernatant was decanted and the solids were washed four times with 160 ml of hexane.

The activated catalysts of examples 18-20 were used in the method described before the examples section for polymerizing propylene. The polymer morphology of the polymers made using each of the catalysts is shown in Table 2 below.

TABLE 2

Polymerization results

| EX | D50, μm | Span | Ti | Mg | Donor | CE | BD | MFI | % XS | D50 | Span | Fines < 150 mm |
|---|---|---|---|---|---|---|---|---|---|---|---|---|
| 18 | 25.7 | 0.893 | 1.37 | 19.04 | 10.96 | 32.3 | 0.418 | 7.4 | 1.54 | 967 | 0.672 | 0 |
| 19 | 39.4 | 0.985 | 1.07 | 20.13 | 11.95 | 41.0 | 0.456 | 8.0 | 1.45 | 1767 | 0.504 | 0 |
| 20 | 37.5 | 0.855 | 1.43 | 15.23 | 18.15 | 46.0 | 0.435 | 7.5 | 2.22 | 1412 | 0.446 | 0 |

Figure 3:
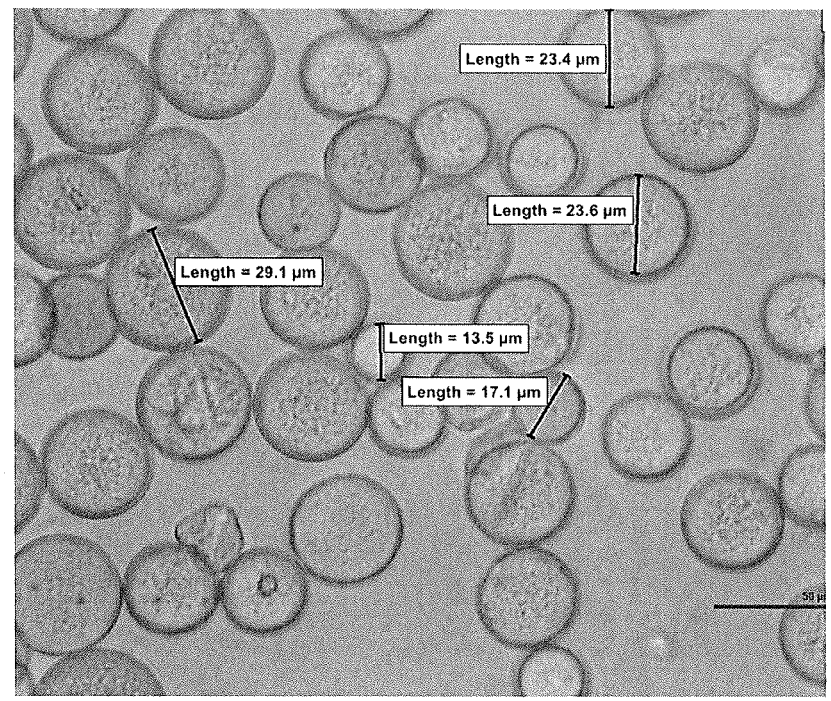
FIG. 3 shows a microscopic view of the catalyst support of Example 21.
Figure 4:
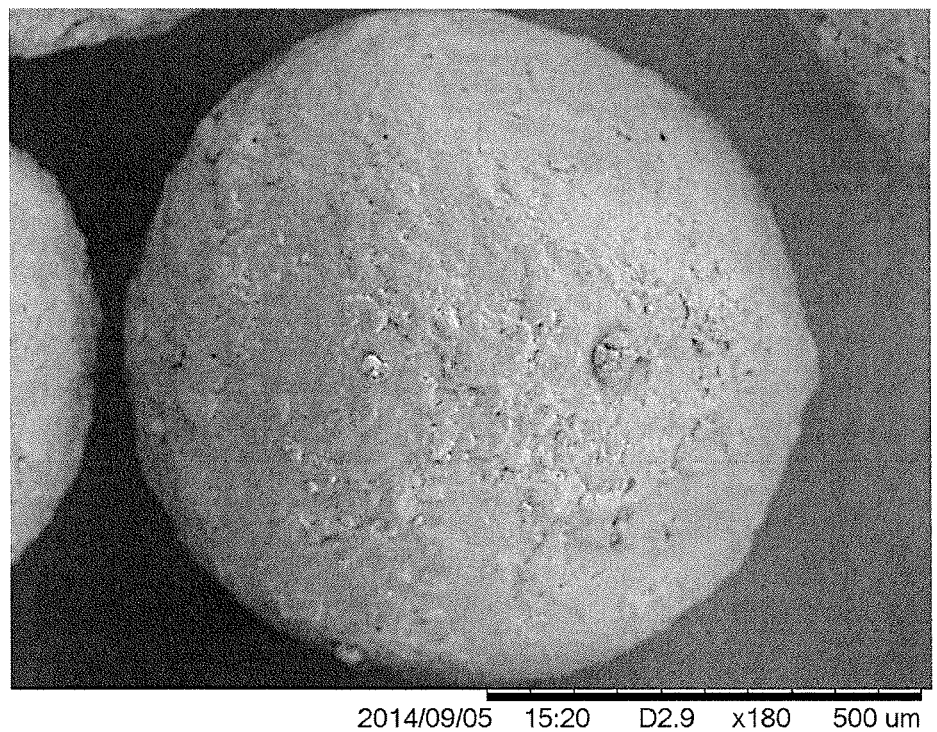
FIG. 4 shows a SEM picture of a polymer particle produced with the catalyst of Example 21.
Figure 5:
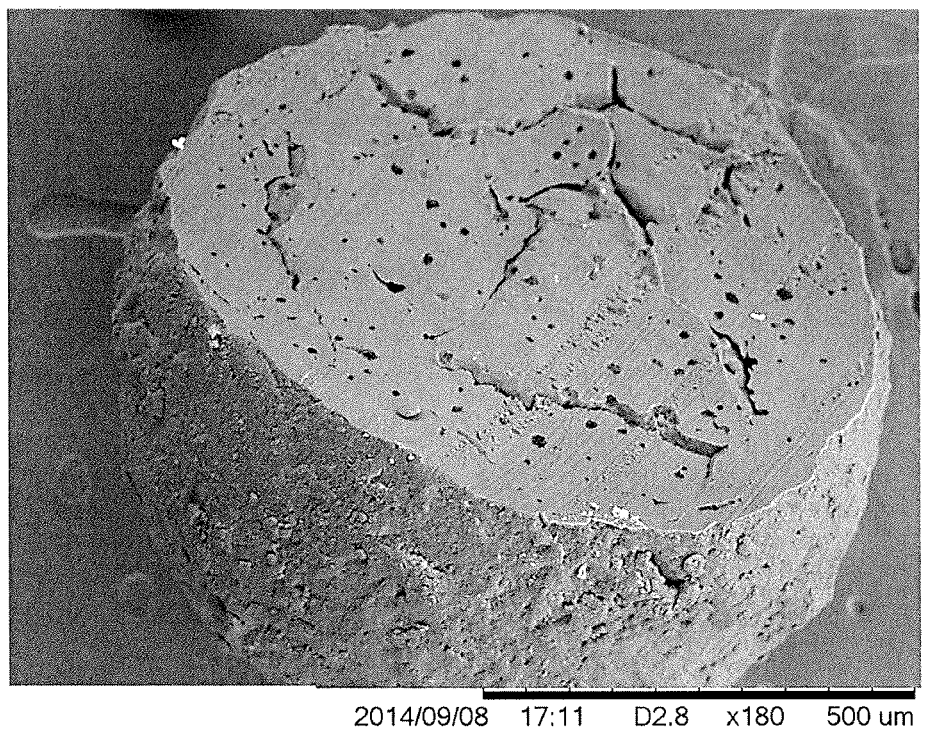
FIG. 5 shows a SEM picture of a cross-section of a polymer particle produced with the catalyst of Example 21.

Example 21 Demonstrates Activating a Catalyst Support that was Prepared Using Dibutyl Ether as a First Electron Donor The catalyst support of example 1 was activated for use in Ziegler-Natta catalyst system as follows. During the ramping to 85° C. to precipitate the support, 2.60 g of diisononylphtalate was added and heated for 1 hour. The supernatant was filtered and 240 ml of 10 vol % $TiCl_4$/toluene solution and 6.70 g of diisononylphtalate were added to the reactor and heated at 80° C. for 1 hour. The solids were washed with toluene three times (200 ml, 10 min). The solids were then contacted with 264 ml of 10 vol % $TiCl_4$/Toluene and 4.80 g of diisononylphtalate for 1 hour at 95° C. The supernatant was filtered and the solids were contacted with 264 ml of 10 vol % $TiCl_4$/Toluene at 110° C. for 30 min for three times. The supernatant was decanted and the solids were washed four times with 160 ml of hexane. FIG. 3 shows a microscope picture of the activated catalyst component of Example 21. FIG. 4 shows a SEM picture of a polymer particle produced using the activated catalyst component of Example 21. FIG. 5 shows a SEM picture of a cross-section of a polymer particle produced using the activated catalyst component of Example 21.

Examples 22-25 show the effect of dibutyl ether (DBE) amount on Catalyst size and morphology.

Example 22 Demonstrates Preparing a Spherical Catalyst Component Using 6 g Dibutyl Ether as a First Electron Donor A catalyst is synthesized according to the following method. 5.0 g fine Magnesium chloride, 5.0 g epichlorohydrin and 12.74 g of tributylphosphate were dissolved in a mixture of 22.5 g toluene and 22.5 g hexane at 60° C. for 5 hours with agitation at 400 rpm. Then 1.65 g of phthalic anhydride was added and the solution was held for 1 hour at 60° C. The solution was cooled to 22° C., and 2.7 g VISCOPLEX® in 15 g of hexane and 6 g of dibutyl ether in 5 g of hexane were added to the reaction mixture. The solution was then cooled down to 0° C. and 109 ml of $TiCl_4$ was added over 90 min while maintaining agitation at 400 rpm and the temperature at 0° C. The reaction temperature was increased to 10° C. in 30 min and held for 30 min and increased to 50° C. and held for 30 min, then to 90° C. and held for 30 min. The mother liquor was filtered and 100 ml of toluene and 0.97 g 1,8-napthyl dibenzoate ("Thane-6") were added to the reactor and heated at 85° C. for 2 hours. The supernatant was filtered and solids were washed with toluene three times (60 ml, 10 min) at 85° C. The solids were then contacted with 100 ml of 10 vol % $TiCl_4$/Toluene for 1 hour at 105° C. The supernatant was filtered and the solids were contacted with 66 ml of 10 vol % $TiCl_4$/Toluene at 110° C. for 1 hour. The supernatant was decanted and the solids were washed four times with 160 ml of hexane.

Example 23 Demonstrates Preparing a Spherical Catalyst Component Using 4.9 g Dibutyl Ether as a First Electron Donor A catalyst component was made by the method of Example 22, except the dibutyl ether amount was 4.9 g.

Example 24 Demonstrates Preparing a Spherical Catalyst Component Using 4.0 g Dibutyl Ether as a First Electron Donor A catalyst component was made by the method of Example 22, except the dibutyl ether amount was 4.0 g.

Example 25 Demonstrates Preparing a Spherical Catalyst Component Using 3.0 g Dibutyl Ether as a First Electron Donor A catalyst component was made by the method of Example 22, except the dibutyl ether amount was 3.0 g.

Comparative Example 1 Demonstrates Preparing a Spherical Catalyst Component Using No First Electron Donor A catalyst component was made by the method of Example 22, except no dibutyl ether was added.

Figure 6:
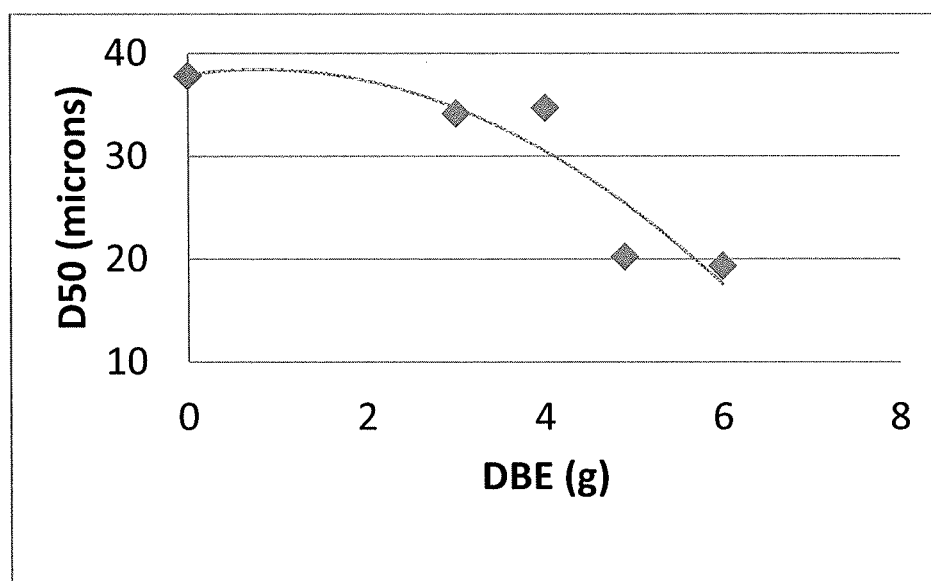
FIG. 6 shows a graph illustrating the particular effect on particle size of a catalyst of the amount of dibutyl ether.

Table 3 shows the effect of the DBE amount on the catalyst particle size. The catalyst particle size was sensitive to the DBE amount. The catalyst size becomes smaller with increased amounts of DBE as illustrated in FIG. 6 under the conditions studied. The catalyst span was narrow in the range from 3 g to 6 g of DBE. Without DBE, the catalyst particle distribution becomes broader. The catalyst becomes more porous and becomes more fragile with less DBE added.

TABLE 3

Final catalyst particle size

| Example | DBE (g) | Final D10, μm | Final D50, μm | Final D90, μm | Final Span |
|---|---|---|---|---|---|
| 22 | 6.0 | 13.1 | 18.9 | 26.9 | 0.733 |
| 23 | 4.9 | 13.6 | 19.5 | 27.7 | 0.725 |
| 24 | 4.0 | 24.3 | 34.2 | 48.0 | 0.690 |
| 25 | 3.0 | 22.5 | 32.8 | 47.4 | 0.760 |
| Comp. 1 | 0 | 14.8 | 32.7 | 59.1 | 1.354 |

Catalysts of examples 22-25 and comparative example 1 were used for the polymerization of propylene according to the method described before the examples section for polymerizing propylene. The polymerization results and polymer morphology made using each of the catalysts are shown in Table 4 below.

TABLE 4

Polymerization results

| Ex | DBE g | Ti % | Mg % | THANE % | CE kg/g/h | BD g/ml | MFI dg/min | % XS % | D10 μ | D50 μ | D90 μ | Fines < 150 mm % | Symm3 | B/L | SPHT |
|---|---|---|---|---|---|---|---|---|---|---|---|---|---|---|---|
| 22 | 6.0 | 1.78 | 16.86 | 13.56 | 28.6 | 0.413 | 2.2 | 1.74 | 469 | 608 | 903 | 0 | 0.972 | 0.83 | 0.819 |
| 23 | 4.9 | 1.86 | 17.06 | 13.89 | 26.0 | 0.417 | 1.7 | 1.54 | 508 | 642 | 894 | 0 | 0.921 | 0.835 | 0.894 |
| 24 | 4.0 | 2.57 | 15.75 | 12.53 | 38.8 | 0.244 | 1.8 | 1.92 | 834 | 1190 | 1503 | 0.1 | 0.916 | 0.837 | 0.896 |
| 25 | 3.0 | 2.90 | 15.9 | 12.87 | 40.4 | 0.298 | 1.4 | 1.76 | 898 | 1212 | 1529 | 0 | 0.928 | 0.853 | 0.926 |
| Comp 1 | 0 | 4.00 | 15.19 | 12.48 | 40.8 | 0.270 | 2.1 | 7.30 | 656 | 1212 | 1725 | 0 | 0.888 | 0.776 | 0.845 |

Figure 7:
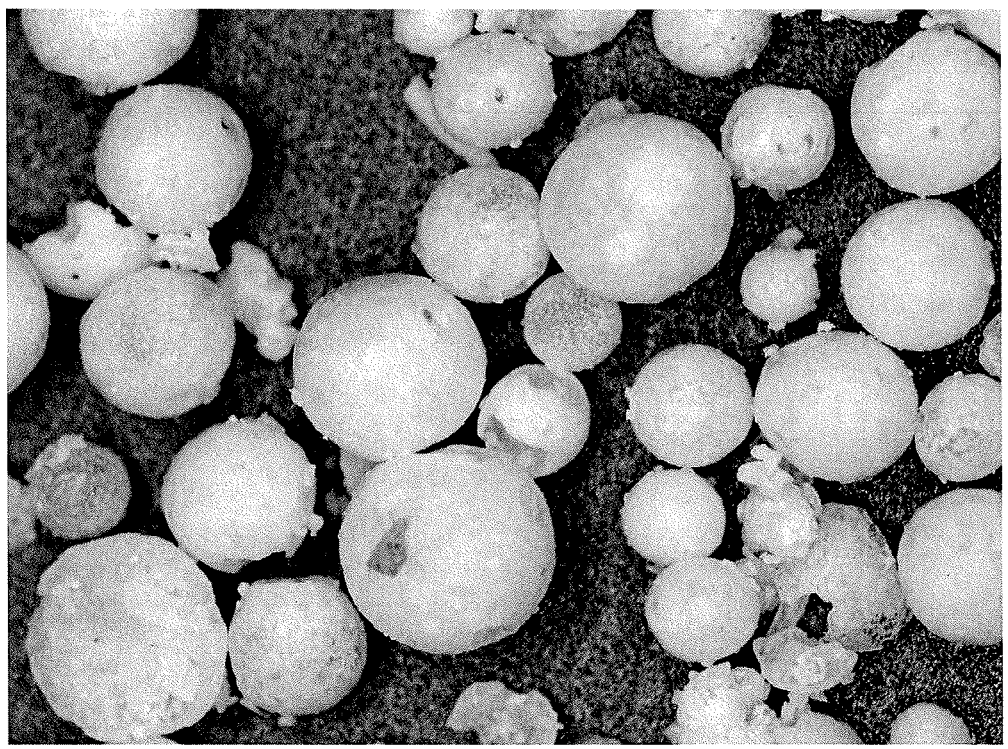
FIG. 7 shows a microscopic view of a polymer produced with the catalyst of Comparative Example 1.

As shown in Table 4, the bulk density of the polymer was in the range of 0.24 to 0.41 g/ml. The low bulk density of polymers is mostly due to the porous catalyst produced with low DBE amounts since the polymer morphology also becomes porous. FIG. 7 shows a microscope picture of polymer particles produced using the catalyst of Comparative Example 1.

Examples 26-30 show the effect of VISCOPLEX® amount on the catalyst size distribution.

Example 26 Demonstrates Preparing a Spherical Catalyst Component Using 2.0 g VISCOPLEX®

A catalyst is synthesized according to the following method. 5.0 g fine Magnesium chloride, 5.0 g epichlorohydrin and 12.74 g of tributylphosphate were dissolved in a mixture of 22.5 g toluene and 22.5 g hexane and 60° C. for 5 hours with agitation at 400 rpm. Then 1.65 g of phthalic anhydride was added and the solution was held for 1 hour at 60° C. The solution was cooled to 22° C. and 2.0 g VISCOPLEX® in 15 g of hexane and 4 g of dibutyl ether in 5 g of hexane were added to the reaction mixture. The solution was then cooled down to 0° C. and 109 ml of TiCl$_4$ was added over 90 min while maintaining agitation at 400 rpm and the temperature at 0° C. The reaction temperature was increased to 10° C. in 30 min and held for 30 min and increased to 50° C. and held for 30 min, then to 90° C. and held for 30 min. The mother liquor was filtered and 100 ml of toluene and 0.97 g Thane 03-06 were added to the reactor and heated at 85° C. for 2 hours. The supernatant was filtered and solids were washed with toluene three times (66 ml, 10 min) at 85° C. The solids were then contacted with 100 ml of 10 vol % TiCl$_4$/Toluene for 1 hour at 105° C. The supernatant was filtered and the solids were contacted with 100 ml of 10 vol % TiCl$_4$/Toluene at 110° C. for 1 hour. The supernatant was filtered and the solids were contacted twice with 100 ml of 10 vol % TiCl$_4$/Toluene at 110° C. for 0.5 hours. The supernatant was decanted and the solids were washed four times with 160 ml of hexane.

Example 27 Demonstrates Preparing a Spherical Catalyst Component Using 2.7 g VISCOPLEX®

A catalyst component was made by the method of Example 26, except the VISCOPLEX® amount was 2.7 g.

Example 28 Demonstrates Preparing a Spherical Catalyst Component Using 4.0 g VISCOPLEX®

A catalyst component was made by the method of Example 26, except the VISCOPLEX® amount was 4.0 g.

Example 29 Demonstrates Preparing a Spherical Catalyst Component Using 6.0 g VISCOPLEX®

A catalyst component was made by the method of Example 26, except the VISCOPLEX® amount was 6.0 g.

Example 30 Demonstrates Preparing a Spherical Catalyst Component Using 9.0 g VISCOPLEX®

A catalyst component was made by the method of Example 26 except the VISCOPLEX® amount was 9.0 g.

TABLE 5

Effect of the amount of VISCOPLEX ® on Catalyst Size

| Ex | VISCOPLEX® g | INT D10 μ | INT D50 μ | INT D90 μ | INT Span | Final D10 μ | Final D50 μ | Final D90 μ | Final Span |
|---|---|---|---|---|---|---|---|---|---|
| 26 | 2.0 | 30.2 | 42.2 | 58.8 | 0.679 | 26.8 | 41.5 | 58.6 | 0.768 |
| 27 | 2.7 | 24.8 | 34.7 | 48.5 | 0.680 | 24.3 | 34.2 | 48.0 | 0.690 |
| 28 | 4.0 | 13.5 | 22.3 | 36.0 | 1.010 | 11.4 | 19.1 | 31.5 | 1.053 |
| 29 | 6.0 | 13.8 | 20.1 | 28.8 | 0.746 | 10.3 | 17.7 | 29.3 | 1.073 |
| 30 | 9.0 | 14.8 | 42.4 | 124.6 | 2.605 | 10.3 | 17.7 | 29.3 | 1.073 |

Table 5 shows the effect of the amount of VISCOPLEX® on the catalyst size distribution. Incomplete dispersion of the two phases became obvious when more than 4 g of VISCOPLEX® is used. With 9.0 g of VISCOPLEX®, the two phases do not mix together and the catalyst morphology becomes brick shaped. The particle size distributions become broader when VISCOPLEX® above 4.0 g was used but the particle size became smaller with more VISCOPLEX®.

Catalysts of examples 26-29 were used for the polymerization of propylene according to the method described before the examples section for polymerizing propylene. The polymerization results and polymer morphology of the polymers made using each of the catalysts is shown in Table 6 below. The catalysts of examples 26-28 had porous morphology. The polymer bulk density data shown in Table 6 below also shows this trend. Since increasing VISCO- PLEX® to 6.0 g formed complete phase separation during TiCl₄ addition, it was found that the additional recipe modification achieved good morphology and processiblity.

temperature to 90° C. included ramping to 50° C. from 0° C. in 120 min and holding for 30 min and then ramping to 90° C. in 30 min and holding for 30 min.

TABLE 6

Effects of the amount of VISCOPLEX ® on Polymer properties

| Ex | VISCOPLEX ® g | Ti % | Mg % | THANE % | CE kg/g/h | BD g/ml | MFI dg/min | % XS % | D10 μ | D50 μ | D90 μ | Fines < 150 mm % | Symm | B/L | SPHT |
|---|---|---|---|---|---|---|---|---|---|---|---|---|---|---|---|
| 26 | 2.0 | 2.47 | 16.12 | 12.83 | 39.3 | 0.236 | 1.5 | 1.60 | 1212 | 1587 | 1928 | 0 | 0.940 | 0.881 | 0.951 |
| 27 | 2.7 | 2.57 | 15.75 | 12.53 | 38.8 | 0.244 | 1.8 | 1.92 | 834 | 1190 | 1503 | 0.1 | 0.916 | 0.837 | 0.896 |
| 28 | 4.0 | 2.36 | 17.00 | 13.11 | 40.3 | 0.304 | 1.4 | 1.64 | 454 | 789 | 1151 | 0.1 | 0.891 | 0.797 | 0.853 |
| 29 | 6.0 | 1.98 | 15.93 | 14.40 | 36.1 | 0.442 | 1.2 | 1.51 | 455 | 733 | 1020 | 0.1 | 0.918 | 0.845 | 0.897 |

Examples 31-33 show the effect of ramping on the catalyst and polymer properties.

Example 31 Demonstrates Preparing a Spherical Catalyst Component Using a Particular Temperature Ramping Process A catalyst is synthesized according to the following method. 13.2 g fine Magnesium chloride, 13.2 g epichlorohydrin and 33.6 g of tributylphosphate were dissolved in a mixture of 59.5 g toluene and 59.5 g hexane mixture and 60° C. for 5 hours with agitation at 400 rpm. Then 4.32 g of phthalic anhydride was added and the solution was held for 1 hour at 60° C. The solution was cooled to the room temperature and 7.1 of VISCOPLEX® in 30 g of hexane and 13.2 g of dibutyl ether in 10 g of hexane were added to the reaction mixture. The agitation speed was increased to 500 rpm. The solution was then cooled down to 0° C. and 287 ml of TiCl₄ was added over 90 min while maintaining agitation at 500 rpm and the temperature at 0° C. The agitation speed was decreased and the reaction temperature was ramped to 90° C. according to the steps of increasing to 50° C. from 0° C. in 30 min and holding for 30 min and then ramping to 90° C. in 30 min and holding for 30 min. The mother liquor was filtered and 160 ml of toluene and 2.56 g Thane 03-06 were added to the reactor and heated at 85° C. for 1 hour. The supernatant was filtered and solids were washed with toluene three times (260 ml, 10 min) at 85° C. The solids were then contacted with 264 ml of 10 vol % TiCl₄/Toluene for 1 hour at 120° C. The supernatant was filtered and the solids were contacted three times with 264 ml of 10 vol % TiCl₄/Toluene at 110° C. for 0.5 hours. The supernatant was decanted and the solids were washed four times with 100 ml of hexane.

Example 32 Demonstrates Preparing a Spherical Catalyst Component Using a Particular Temperature Ramping Process A catalyst component was made by the method of Example 31, except the steps of ramping the reaction

Example 33 Demonstrates Preparing a Spherical Catalyst Component Using a Particular Temperature Ramping Process A catalyst component was made by the method of Example 31, except the steps of ramping the reaction temperature to 90° C. included ramping to 10° C. from 0° C. in 30 min and holding for 120 min, then ramp to 50° C. in 30 min and holding for 30 min and then to 90° C. in 30 min and holding for 30 min.

Figure 8:
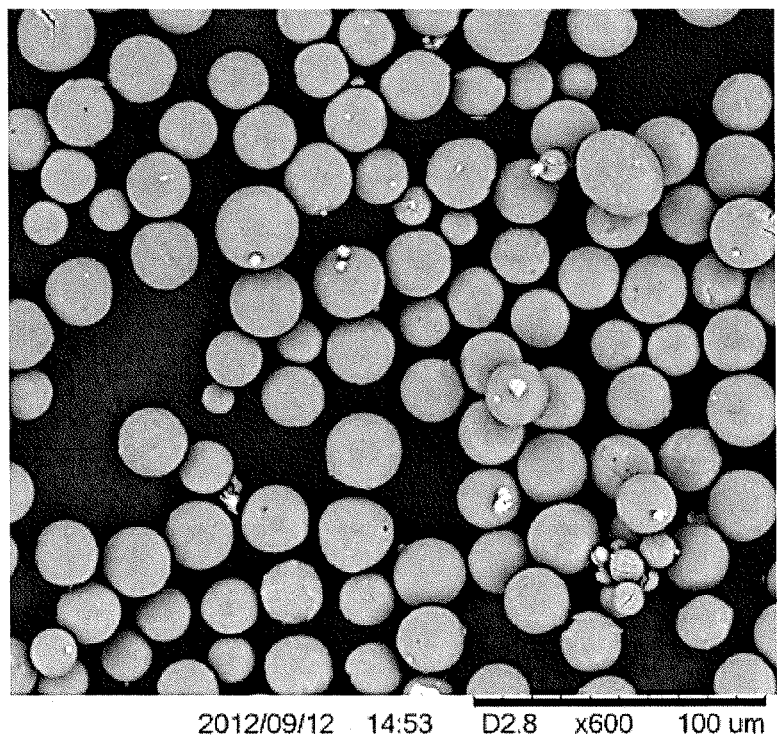
FIG. 8 shows a SEM picture of the catalyst support of Example 33.

The ramping during the precipitation affected the catalyst morphology and the resulting polymer bulk density. Holding at 10° C. for 120 min provided the best catalyst morphology with a particle size of 27 μm. FIG. 8 shows SEM pictures of the catalyst of Example 33.

Catalysts of Examples 31-33 were used for the polymerization of propylene according to the method described before the examples section for polymerizing propylene. The polymerization results and polymer morphology of the polymers made using each of the catalysts is shown in Table 7 below.

TABLE 7

Effect of ramping on the catalyst and polymer properties

| Ex | Cat D50 μ | Span | CE Kg/g/h | BD g/ml | Poly D50 μ | Span | Fines < 150 μ | Symm | SPHT | B/L |
|---|---|---|---|---|---|---|---|---|---|---|
| 31 | 40.5 | 0.668 | 45.5 | 0.227 | 1130 | 0.467 | 0 | 0.921 | 0.920 | 0.835 |
| 32 | 31.2 | 0.679 | 40.9 | 0.366 | 932 | 0.448 | 0 | 0.924 | 0.925 | 0.849 |
| 33 | 26.5 | 0.685 | 44.6 | 0.440 | 739 | 0.441 | 0 | 0.935 | 0.939 | 0.874 |

Example 34 Demonstrates Preparing Spherical Catalyst Support by Use of a Chlorination Agent (Phthaloyl Chloride) Without First Electron Donor (Ether)

A mixture of 6.6 g of anhydrous MgCl₂, 7.0 g of epichlorohydrin, 17.0 g of tributyl phosphate, and 2.0 g of phthalic anhydride was dissolved in 60 g of toluene at 70° C. for 2 hours with agitation (400 rpm) to form a first solution. 7.2 ml of phthaloyl chloride was added at 60° C. to the first solution and held for 30 minutes to form a second solution. The addition of phthaloyl chloride caused an exothermic effect such that the second solution was at a temperature of 87° C. at the end of the 30 minutes. The second solution was cooled down to 22° C. and transferred to a reactor containing a mixture of 100 g TiCl₄ and 35 g of hexane at −25° C. to form a third solution. 3.0 g of VISCOPLEX® in 25 g of hexane was added to the third solution to form a fourth solution. The fourth solution was heated to 85° C. to form a solid. The solid was washed with toluene. At this point, the magnesium-based catalyst support was collected, and the particle size D50 was 150 µm, as measured using microscopic imaging.

Example 35 Demonstrates Preparing the Spherical Component with Chlorination Agent (Phthaloyl Chloride), First Electron Donor (Isoamyl Ether) and a Second Electron Donor (Diisonoyl Phthalate)

A mixture of 6.6 g of anhydrous $MgCl_2$, 7.0 g of epichlorohydrin, 17.0 g of tributyl phosphate, and 2.0 g of phthalic anhydride was dissolved in 80 g of toluene at 60° C. for 2 hours with agitation to form a first solution. 7.2 ml of phthaloyl chloride was added at 60° C. to the first solution and held for 30 minutes to form a second solution. The addition of phthaloyl chloride caused an exothermic effect such that the second solution was at a temperature of 87° C. at the end of the 30 minutes. The second solution was cooled to 60° C. and 6.0 g of isoamyl ether was added to the second solution to form a third solution. The third solution was cooled to 22° C. and 4.0 g of VISCOPLEX® in 25 g of hexane was added to the third solution to form a fourth solution. The fourth solution was cooled to 5° C. and 140 g of $TiCl_4$ was added to form a fifth solution. The fifth solution was heated from 5° C. to 45° C. in 30 minutes and from 45° C. to 90° C. in 30 minutes to form a solid. The solid was washed with toluene. The solid was treated with 10% vol $TiCl_4$/toluene at 95° C. in the presence of 1.0 g of diisononyl phthalate (DINP). The 10% vol $TiCl_4$/toluene treatment was repeated three times at 110° C. for 30 minutes. As measured by microscopic imaging, the particle size was D50=21.7 µm and span=0.911. The activated catalyst composition is shown in Table 8 below.

Example 36 Demonstrates Preparing a Spherical Support Using Chlorination Agent (2-Furoyl Chloride) and First Electron Donor (Isoamyl Ether)

A mixture of 6.6 g of anhydrous $MgCl_2$, 13.0 g of epichlorohydrin, 13.0 g of tributyl phosphate, and 2.0 g of phthalic anhydride was dissolved in 50 g of toluene and 50 g of hexane at 60° C. for 2 hours with agitation to form a first solution. 10.0 g of 2-furoyl chloride was added at 60° C. to the first solution and held for 30 minutes to form a second solution. 6.0 g of isoamyl ether was added to the second solution at 60° C. to form a third solution. The third solution was cooled to 22° C. and 4.0 g of VISCOPLEX® in 20 g of hexane was added to the third solution to form a fourth solution. The fourth solution was cooled to 5° C. and 140 g of $TiCl_4$ was added to form a fifth solution. The fifth solution was heated from 5° C. to 85° C. in 30 minutes to form a solid. The solid was washed with toluene. As measured by microscopic imaging, the particle size was D50=165 µm and span=0.995.

Figure 9A:
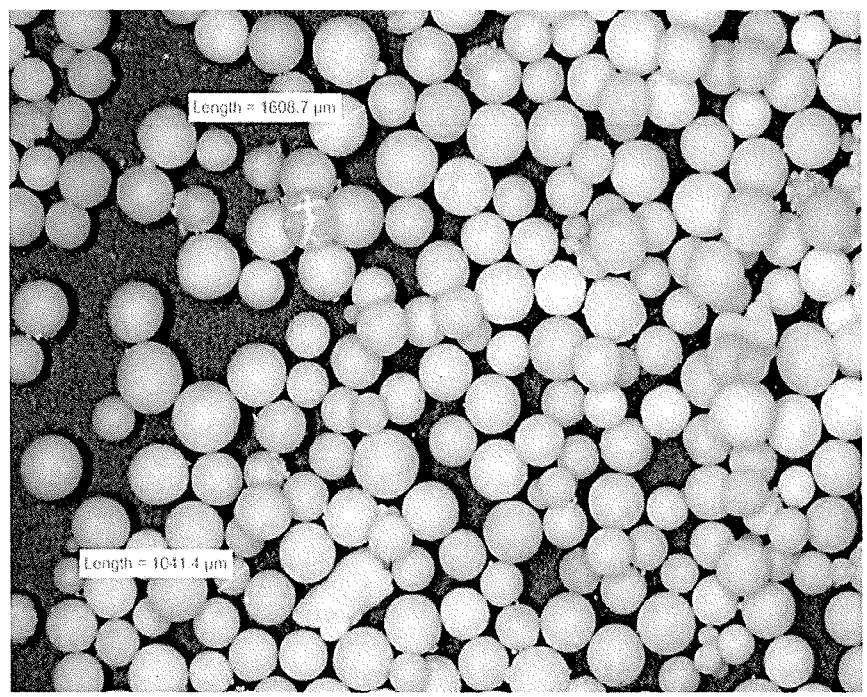
FIG. 9A shows a microscopic view of polypropylene produced with the catalyst component of Example 37.
Figure 9B:
FIG. 9B shows another microscopic view of the polypropylene in FIG. 9A.

Example 37 Demonstrates Preparing a Spherical Catalyst Component Using 2-Furoyl Chloride as a Chlorination Agent, Isoamyl Ether as a First Electron Donor and 1,8-Naphthyl Dibenzoate as Second Electron Donor A mixture of 6.6 g of anhydrous $MgCl_2$, 13.0 g of epichlorohydrin, 13.0 g of tributyl phosphate, and 2.0 g of phthalic anhydride was dissolved in 70 g of toluene and 30 g of hexane at 60° C. for 2 hours with agitation to form a first solution. 10.2 g of 2-furoyl chloride was added at 60° C. to the first solution and held for 30 minutes to form a second solution. The second solution was cooled to 22° C. and 15.0 g of isoamyl ether was added to the second solution to form a third solution. 4.0 g of VISCOPLEX® in 20 g of hexane was added to the third solution to form a fourth solution. The fourth solution was cooled to 2° C. and 140 g of $TiCl_4$ was added with an agitation speed of 600 rpm to form a fifth solution. The fifth solution was heated from 2° C. to 45° C. in 30 minutes and from 45° C. to 90° C. in 30 minutes to form a solid. The solid was washed with toluene. As measured by microscopic imaging, the particle size was D50=50.7 µm and span=0.897. The solid was treated with 135 ml of 40% vol $TiCl_4$/toluene at 85° C. for 1 hour in the presence of 1.0 g of 1,8-napthyl dibenzoate ("Thane-6"). Activation was conducted with two treatments of 20% vol $TiCl_4$/toluene at 110° C. for 30 minutes. The catalyst had a particle size of D50=44.8 µm and span=1.261. A digital image of a microscopic view of polypropylene produced with the catalyst component of Example 37 is shown in FIGS. 9A and 9B.

Figure 10:
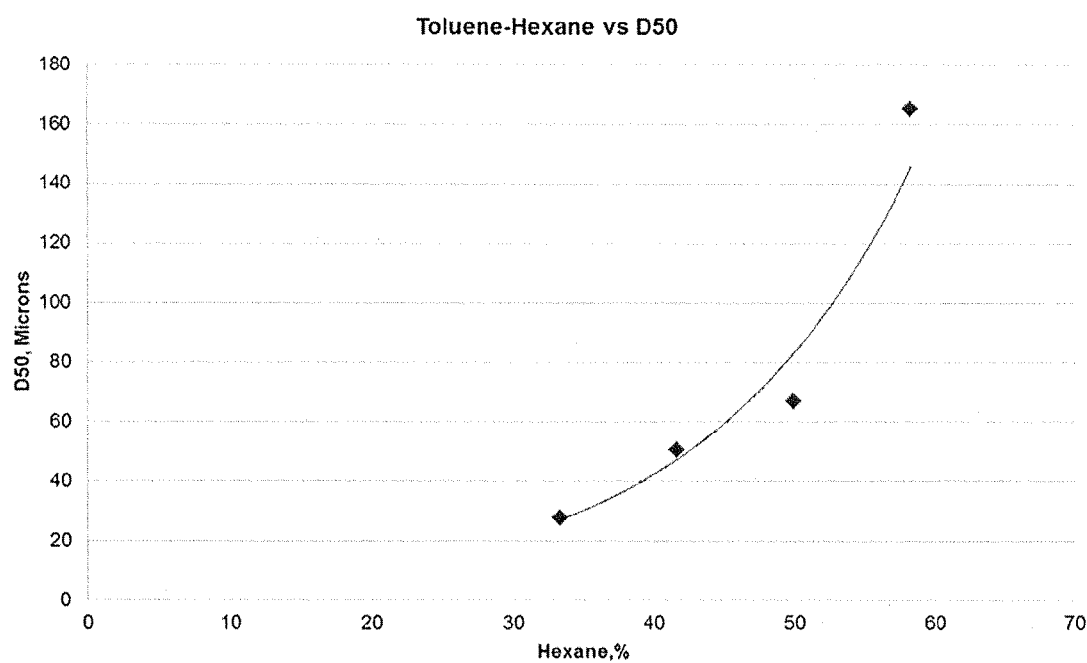
FIG. 10 shows a graph illustrating the particular effect on particle size of a catalyst of the toluene/hexane ratio where 2-furoyl chloride is the halogenating agent.

The toluene/hexane ratio affects the particle size. The particular effect on particle size of the toluene/hexane ratio where 2-furoyl chloride is used as the halogenating agent is shown in the graph shown in FIG. 10. As shown in FIG. 10, as the percentage of hexane increases from 30% to 60%, the D50 particle size increases from less than 30 µm to greater than 160 µm.

2-furoyl chloride demonstrated better performance (i.e., faster filtration, better catalyst morphology) than phthaloyl chloride. It was also found that increasing the amount of epichlorohydrin improved the precipitation and filtration processes. Further, it was found that increasing the amount of isoamyl ether reduced the particle size of the support/catalyst. Also, it was found that increasing the amount of hexane with reduct of isoamyl ether resulted in a large particle size.

Example 38 Demonstrates Preparing a Spherical Catalyst Component Using 2-Furoyl Chloride as a Chlorination Agent, Isoamyl Ether as a First Electron Donor and 1,8-Naphthyl Dibenzoate as Second Electron Donor Example 37 was repeated except 10.0 g of isoamyl ether was added to the second solution and 33% hexane was in the fourth solution. The catalyst properties are reported in Table 8.

Figure 11:
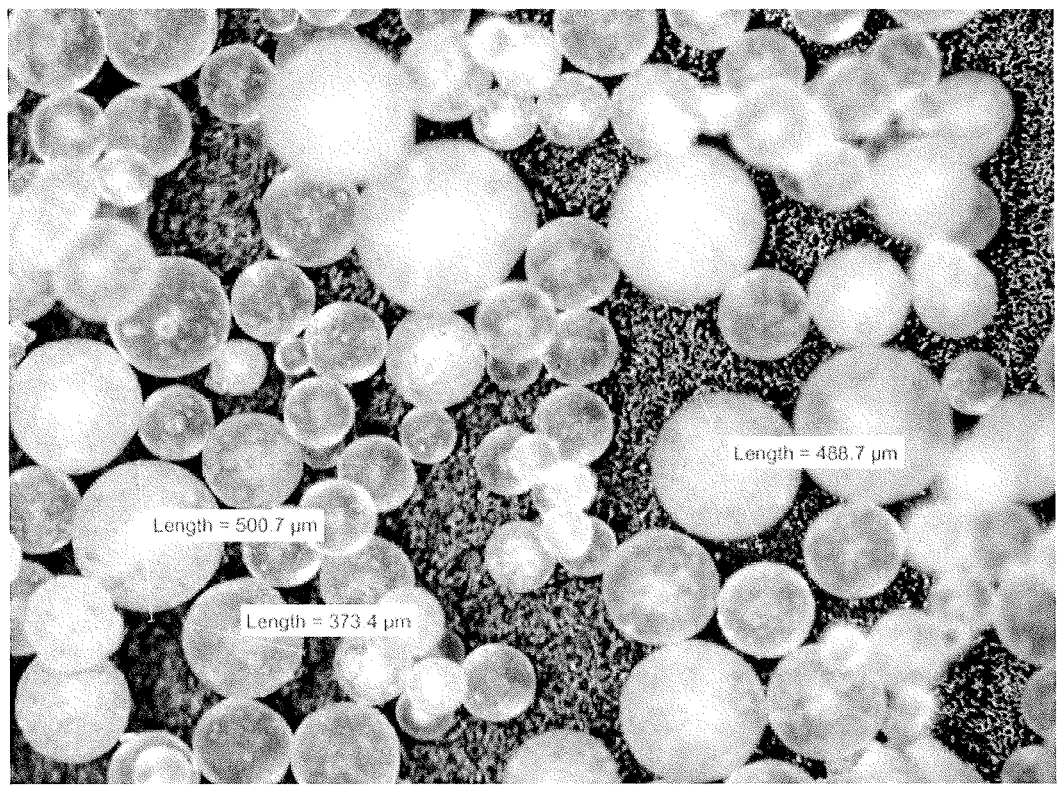
FIG. 11 shows a microscopic view of polypropylene produced with the catalyst component of Example 39.

Example 39 Demonstrates Preparing a Spherical Catalyst Component Using 2-Furoyl Chloride as a Chlorination Agent, Isoamyl Ether as a First Electron Donor and 1,8-Naphthyl Dibenzoate as Second Electron Donor Example 37 was repeated except 10.0 g of isoamyl ether was added to the second solution, and 5.0 g of VISCOPLEX® was added to the third solution and 37% hexane was in the fourth solution. The catalyst properties are reported in Table 8. A digital image of a microscopic view of polypropylene produced with the catalyst component of Example 39 is shown in FIG. 11.

Example 40 Demonstrates Preparing a Spherical Catalyst Component Using 2-Furoyl Chloride as a Chlorination Agent, Isoamyl Ether as a First Electron Donor and 1,8-naphthyl Dibenzoate as Second Electron Donor Example 37 was repeated except 15.0 g of isoamyl ether was added to the second solution and 42% hexane was in the fourth solution. The catalyst properties are reported in Table 8.

Example 41 Demonstrates Preparing a Spherical Catalyst Component Using T-butyl Chloride as a Chlorination Agent, Isoamyl Ether as a First Electron Donor and 1,8-Naphthyl Dibenzoate as Second Electron Donor A mixture of 6.6 g of anhydrous $MgCl_2$, 13.0 g of epichlorohydrin, 13.0 g of tributyl phosphate, and 2.0 g of phthalic anhydride was dissolved in 70 g of toluene and 30 g of hexane at 60° C. for 2 hours with agitation to form a first solution. 7.0 g of t-butyl chloride was added at 60° C. to the first solution and held for 30 minutes to form a second solution. The second solution was cooled to 22° C. and 8.0 g of isoamyl ether was added to the second solution to form a third solution. 4.0 g of VISCOPLEX® in 20 g of hexane was added to the third solution to form a fourth solution. The fourth solution was cooled to 2° C. and 140 g of $TiCl_4$ was added to the fourth soultion with an agitation speed of 600 rpm to form a fifth solution. The fifth solution was heated from 2° C. to 85° C. to form a solid. The solid was washed with toluene. The solid was treated with 10% vol $TiCl_4$/toluene at 95° C. for 1 hour in the presence of 0.5 g of 1,8-naphthyl dibenzoate ("Thane-6"). Activation was conducted with two treatments of 10% vol $TiCl_4$/toluene at 110° C. for 30 minutes. The catalyst had a particle size of D50=21.4 μm and span=0.739.

The halogenation step with t-butyl chloride occurred with less visible exothermic effect than with 2-furoyl chloride. The activity of the catalyst made with t-butyl chloride was around 40 kg/g, which was higher than for the other chlorination agents.

Example 42 Demonstrates Preparing a Spherical Catalyst Component Using T-butyl Chloride as a Chlorination Agent, Isoamyl Ether as a First Electron Donor and 1,8-Naphthyl Dibenzoate as Second Electron Donor Example 41 was repeated except 50% hexane was in the fourth solution. The catalyst properties are reported in Table 8.

Table 8 below provides properties of Examples 35-42. In Table 8, Sol #1 represents a solution of 6.6 g of $MgCl_2$, 7.0 g of epoxy chloropropane, 17.0 g tributyl phosphate, and 2.0 g phthalic anhydride. Sol #2 represents a solution of 6.6 g of $MgCl_2$, 13.0 g of epoxy chloropropane, 13.0 g of tributyl phosphate, and 2.0 g of phthalic anhydride. PhCl represents phthaloyl chloride. FuCl represents 2-furoyl chloride. t-BuCl represents t-butyl chloride. IE represents isoamyl ether. Donor refers to the electron donor used in activation of the catalyst. D50 represents the size of catalyst system particles (diameter) (D50 for Example 35 is for the catalyst component before activation), wherein 50% of particles are less than that size, BD represents bulk density, XS represents xylene solubles, and net catalytic activity (CE) reported in unites of $kg_{polymer}/(g_{cat}*hr)$ is calculated by dividing the amount of olefin polymer produced (kg) by the mass of the titanium catalyst component and scaling the resulting value to a time period of one hour. The amount of polymer produced is determined by subtracting the amount of polymer computed to be formed in then condensed phase prior to evaporation of olefin monomers form the total mass of polymer recovered. At any particular point in the polymerization reaction, the instantaneous reaction activity of olefin polymer production varies.

Examples 35-42 demonstrate a process for high density catalyst particles confirmed by high density of polymers produced.

Figure 12A:
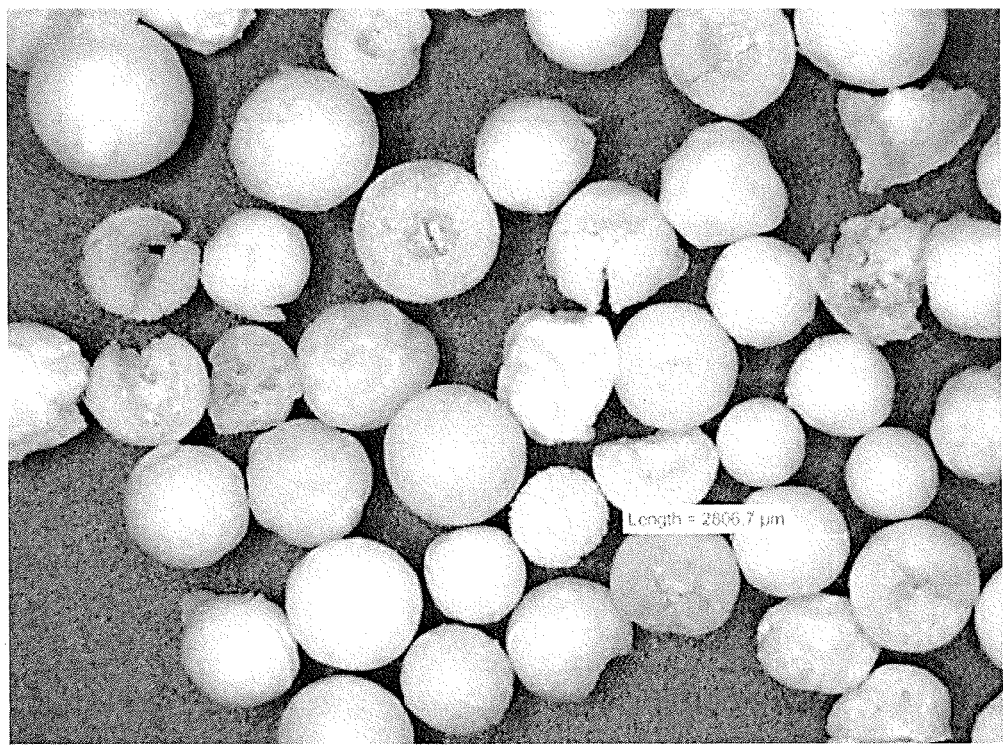
FIG. 12A shows a microscopic view of polypropylene produced with the catalyst component of Comparative Example 2.
Figure 12B:
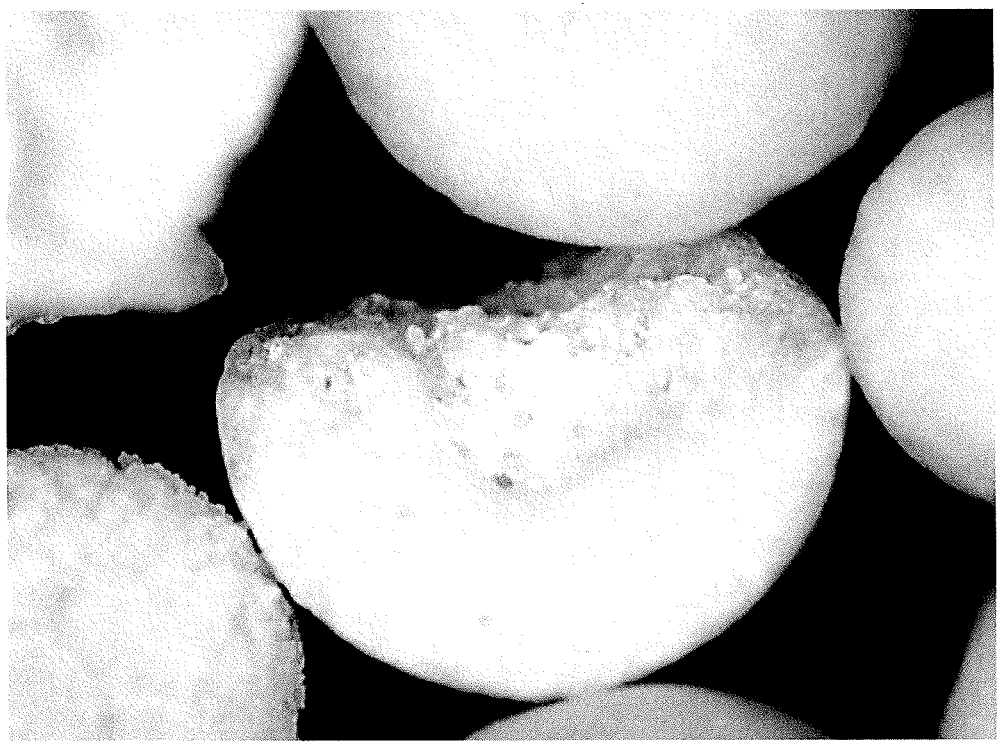
FIG. 12B shows another microscopic view of the polypropylene in FIG. 12A.

Comparative Example 2 Demonstrates Preparing a Spherical Catalyst Component Without a Chlorination Agent and a First Electron Donor A mixture of 6.6 g of anhydrous $MgCl_2$, 13.0 g of epichlorohydrin, 13.0 g of tributyl phosphate, and 2.0 g of phthalic anhydride was dissolved in 70 g of toluene and 30 g of hexane at 60° C. for 2 hours with agitation to form a first solution. The first solution was cooled to 22° C. and 4.0 g of VISCOPLEX® in 20 g of hexane was added to the first solution to form a second solution. The second solution was cooled to 2° C. and 140 g of $TiCl_4$ was added to the second solution with an agitation speed of 600 rpm to form a third solution. The third solution was heated from 2° C. to 45° C. in 30 minutes and from 45° C. to 90° C. in 30 minutes to form a solid. The solid was washed with toluene. The solid was treated with 10% vol $TiCl_4$/toluene at 95° C. for 1 hour in the presence of 0.5 g of 1,8-naphthyl dibenzoate ("Thane-6"). Activation was conducted with two treatments of 10% vol $TiCl_4$/toluene at 110° C. for 30 minutes. The catalyst had a particle size of D50=66.4 μm and span=1.551. Table 8 provides properties of Comparative Example 2. A digital image of a microscopic view of the polypropylene produced with the catalyst of Comparative Example 2 is shown in FIGS. 12A and 12B.

TABLE 8

Experiments with organic chlorination agents

| Ex. # | Mg-Solution | Cl-Agent | IE, g | VISCOPLEX®, g | Hexane, % | Donor | D50 μ | Ti, % | Donor, % | CE, kg/g/h | XS, % | MFI, g/10 min | BD, g/cm³ |
|---|---|---|---|---|---|---|---|---|---|---|---|---|---|
| 35 | Sol #1 | PhCl | 6.0 | 4.0 | 23 | DINP | 21.7 | 0.98 | 7.0 | 15.4 | 1.98 | 12.0 | 0.467 |
| 36 | Sol #2 | FuCl | 6.0 | 4.0 | 58 | | 165 (Int) | | | | | | |
| 37 | Sol #2 | FuCl | 15.0 | 4.0 | 42 | Thane 6 | 44.8 | 1.62 | 12.0 | 26.2 | 1.51 | 2.0 | 0.413 |
| 38 | Sol #2 | FuCl | 10.0 | 4.0 | 33 | Thane 6 | 35.0 | 0.79 | 5.8 | 15.5 | 1.98 | 2.9 | 0.444 |
| 39 | Sol #2 | FuCl | 10.0 | 5.0 | 37 | Thane 6 | 15.4 | 2.21 | 16.2 | 11.4 | 1.40 | 3.2 | 0.437 |
| 40 | Sol #2 | FuCl | 10.0 | 4.0 | 42 | Thane 6 | 43.3 | 3.24 | 11.3 | 16.0 | 1.52 | 2.3 | 0.463 |

TABLE 8-continued

Experiments with organic chlorination agents

| Ex. # | Mg-Solution | Cl-Agent | IE, g | VISCOPLEX ®, g | Hexane, % | Donor | D50 μ | Ti, % | Donor, % | CE, kg/g/h | XS, % | MFI, g/10 min | BD, g/cm³ |
|---|---|---|---|---|---|---|---|---|---|---|---|---|---|
| 41 | Sol #2 | t-BuCl | 8.0 | 4.0 | 42 | Thane 6 | 21.4 | 1.94 | 19.0 | 39.3 | 0.87 | 1.4 | 0.453 |
| 42 | Sol #2 | t-BuCl | 8.0 | 4.0 | 50 | Thane 6 | 28.7 | 2.32 | 15.1 | 38.6 | 1.34 | 0.9 | 0.396 |
| Comp 2 | | No | — | 4.0 | 42 | Thane 6 | 66.4 | 2.61 | 19.9 | 58.6 | 1.40 | 0.6 | 0.270 |

The spherical catalyst without an organic chlorination agent and without isoamyl ether resulted in some spherical particles with a particle size D50 of 66 μm along with many broken particles. The catalyst showed high activity (about 59 kg/g) with low bulk density of polypropylene (0.270 g/ml).

Examples 43 and 44 show the water content of $MgCl_2$ on morphology and catalyst properties.

Example 43 Demonstrates Preparing a Spherical Catalyst Component Using Dried Magnesium Chloride A catalyst is synthesized according to the following method. 13.2 g 24 mesh Magnesium chloride, which has been dried at 210° C. for 6-8 hours, 14.25 g epichlorohydrin and 36.3 g of tributylphosphate were dissolved in 59.5 g toluene at 60° C. for 5 hours and 400 rpm. Then 5.1 g of phthalic anhydride and 59.5 g hexane were added and the solution was held for 1 hour at 60° C. The solution was cooled to the room temperature and 8.5 of VISCOPLEX® in 30 g of hexane and 8 g of diisoamyl ether in 10 g of hexane were added to the reaction mixture. The agitation speed was increased to 500 rpm. The solution was then cooled down to 0° C. and 287 ml of $TiCl_4$ was added over 90 min while maintaining agitation at 500 rpm and the temperature at 0° C. The agitation speed was decreased to 400 rpm and the reaction temperature was increased to 10° C. and held for 2 hours. The reaction temperature was then increased to 85° C. in 70 min. At 80° C., 2.6 g of diisooctylphthalate (DIOP) was added. The mixture was agitated at 85° C. for 60 min and then filtered. The solid was washed with toluene three times (200 ml, 10 min) at the jacket temperature of 85° C. 264 ml of 10% TiCl4/toluene solution and 6.7 g of DIOP in 20 g of toluene were added to the reactor. The mixture was heated at 80° C. at 400 rpm for 1 hour. The supernatant was filtered. 264 ml of 10 vol % $TiCl_4$/Toluene was added and heated to 95° C. At 80° C., 4.8 g of DIOP in 20 g of toluene was added and held for 1 hour at 95° C. The supernatant was filtered and 264 ml of 10 vol % $TiCl_4$/Toluene was added. The mixture was heated to 110° C. and held for 30 min three times. The solids were washed four times with hexane (160 ml each wash) and agitated at 60-65° C. for 10 minutes during each wash.

Example 44 Demonstrates Preparing a Spherical Catalyst Component Using Non-Dried Magnesium Chloride A catalyst component was made by the method of Example 43, except the $MgCl_2$ was not dried before being mixed and dissolved in toluene.

Table 9 shows the average particle size of catalyst prepared from $MgCl_2$ containing different amounts of water.

TABLE 9

Particle size of catalyst

| Ex | $MgCl_2$ $H_2O$ PPM | Final D50 μ | Span |
|---|---|---|---|
| 43 | 1793 | 49.0 | 0.610 |
| 44 | 6583 | 16.1 | 1.093 |

As shown in Table 9, the catalyst size increased from 16.1 μm for non-dried $MgCl_2$ to 49.0 μm for dried $MgCl_2$.

Catalysts of Examples 43 and 44 were used for the polymerization of propylene according to the method described before the examples section for polymerizing propylene. The polymer morphology of the polymers made using each of the catalysts is shown in Table 10 below.

TABLE 10

Effect of water content of $MgCl_2$ on the catalyst and polymer properties

| Ex | Ti % | Mg % | DIOP % | CE Kg/g | BD g/ml | MFI dg/min | XS % | D50 μ | Span | B/L |
|---|---|---|---|---|---|---|---|---|---|---|
| 43 | 1.69 | 18.61 | 17.86 | 45.4 | 0.434 | 7.0 | 2.41 | 1825 | 0.495 | 0.840 |
| 44 | 1.77 | 17.66 | 18.04 | 39.8 | 0.456 | 5.9 | 2.31 | 810 | 1.283 | 0.671 |

Figure 13:
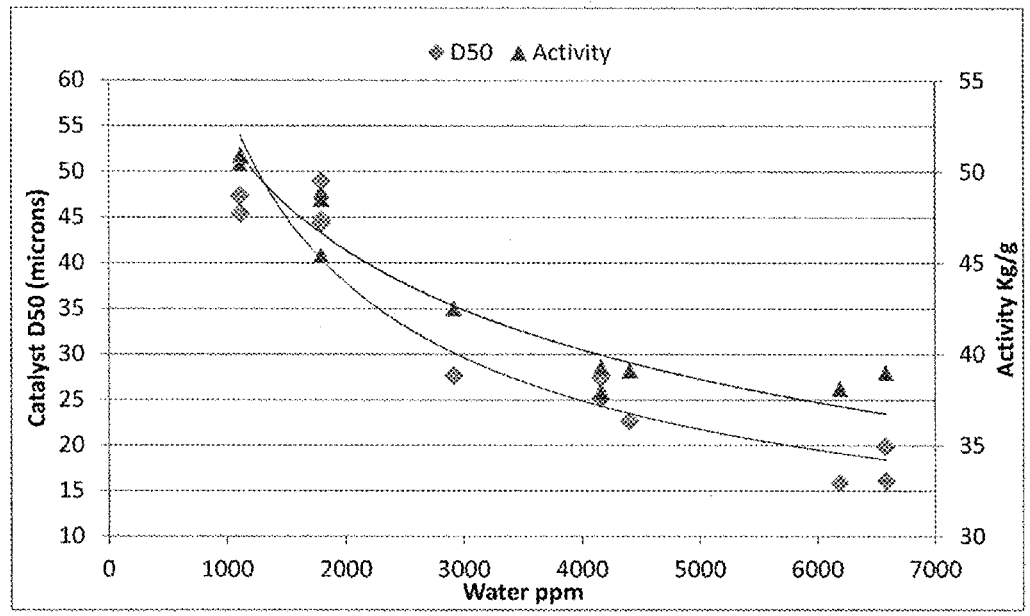
FIG. 13 shows a graph illustrating the effect of water contents on activity and particle size of the catalyst.
Figure 14:
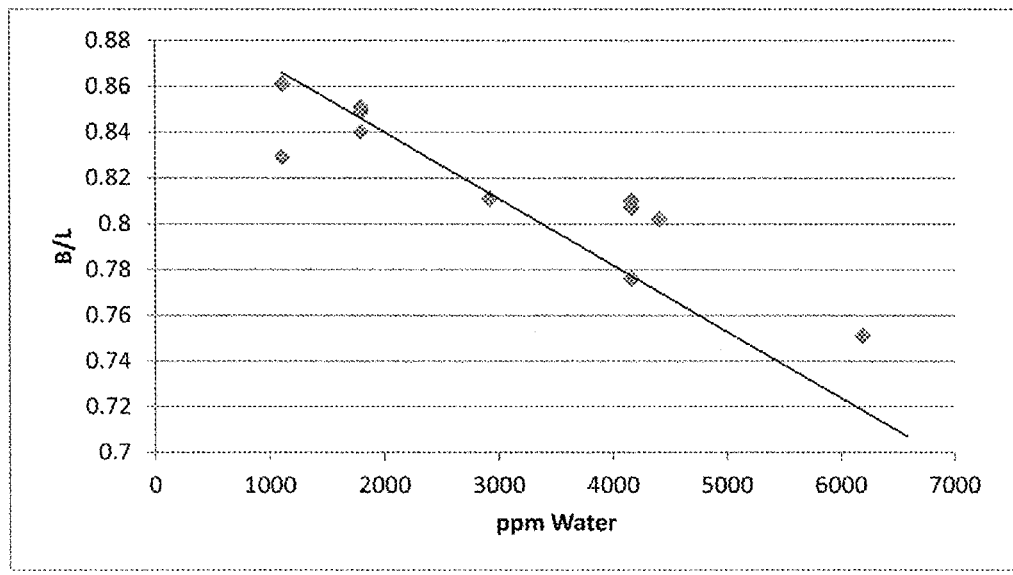
FIG. 14 shows a graph illustrating the effect of water contents on polymer morphology.

The polymerization results in Table 10 show that the activity and polymer morphology improved by drying $MgCl_2$. Additional experiments were performed to confirm the finding. The catalyst activity, morphology and catalyst particle size were strongly affected by the water content of $MgCl_2$ as shown in FIGS. 13 and 14, respectively.

What is claimed is:

1. A method of making a solid catalyst component for production of a polyolefin, comprising
    a) dissolving a halide-containing magnesium compound in a mixture comprising alkylepoxide, an organic phosphorous compound, a carboxylic acid or anhydride, and a hydrocarbon solvent to form a homogenous solution;
    b) optionally treating the homogeneous solution with a halogenating agent;

c) treating the homogenous solution with a first titanium compound in the presence of a surface modifier and a first electron donor that is a di-($C_1$-$C_{12}$) alkylether to form a solid precipitate;

e) treating the solid precipitate with a second titanium compound and a second electron donor to form the solid catalyst component, wherein:
step b) is performed and/or the first electron donor is present in step c); and
the first titanium compound and the second titanium compound are each independently represented by:

Ti(OR)$_g$X$_{4-g}$;

each R group independently represents an alkyl group having 1 to 4 carbon atoms;
X represents Br, Cl, or I; and
g is a whole number satisfying the formula 0≤g≤4.

2. The method of claim 1, wherein step b) is performed.

3. The method of claim 2, wherein the halogenating agent is an organic or inorganic compound containing at least one halogen atom that can be transferred to a magnesium atom.

4. The method of claim 1, wherein the hydrocarbon solvent is an aromatic solvent, non-aromatic solvent, or a mixture comprising an aromatic solvent and a non-aromatic solvent.

5. The method of claim 4, wherein the aromatic solvent comprises toluene or $C_2$-$C_{20}$ alkylbenzene and the non-aromatic solvent comprises hexane or heptane.

6. The method of claim 1, wherein said step c) comprises:
c1) mixing the homogenous solution with the first titanium compound in the presence of the surface modifier and the a di-($C_1$-$C_{12}$)alkylether; and
c2) heating the mixture from step c1) to a temperature from 80° C. to 150° C. to obtain the solid precipitate.

7. The method of claim 1, wherein the surface modifier is an acrylate-based additive.

8. The method of claim 1, wherein the halide-containing magnesium compound is selected from the group consisting of magnesium chloride, magnesium bromide, magnesium iodide, and magnesium fluoride.

9. The method of claim 1, wherein the organic phosphorous compound is represented by a structure:

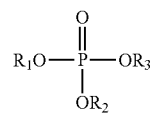

wherein $R_1$, $R_2$, and $R_3$ are each independently selected from the group consisting of methyl, ethyl, and linear or branched ($C_3$-$C_{10}$)alkyl groups.

10. The method of claim 1, wherein the alkylepoxide is represented by

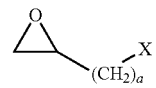

where "a" is from 1 to 5 and X is F, Cl, Br, I, or methyl.

11. The method of claim 1, wherein the carboxylic acid or anhydride is at least one member selected from the group consisting of acetic anhydride, phthalic anhydride, succinic anhydride, maleic anhydride, pyromellitic dianhydride, acetic acid, propionic acid, butyric acid, acrylic acid, and methacrylic acid.

12. The method of claim 1, wherein the second electron donor is at least one selected from the group consisting of carboxylic acid esters, ethers, and ketones.

13. The solid catalyst component produced by the method of claim 1.

14. A catalyst system for use in olefinic polymerization, comprising:
(i) said solid catalyst component of claim 13;
(ii) an organoaluminum compound; and
(iii) optionally an organosilicon compound.

15. A process for polymerizing or copolymerizing an olefin monomer, comprising the steps of:
(i) providing the catalyst system according to claim 14;
(ii) polymerizing or copolymerizing the olefin monomer in the presence of the catalyst system to form a polymer or a copolymer; and
(iii) recovering the polymer or copolymer.

16. The method of claim 1, wherein the di-($C_1$-$C_{12}$) alkylether is selected from the group consisting of dimethyl ether, diethyl ether, dipropyl ether, di-n-butyl ether, butyl propyl ether, diamyl ether, diisoamyl ether, and dihexyl ether.

* * * * *